(12) United States Patent
O'Brien et al.

(10) Patent No.: US 7,774,602 B2
(45) Date of Patent: *Aug. 10, 2010

(54) SECURE MODEM GATEWAY CONCENTRATOR

(75) Inventors: William G. O'Brien, Mississouga (CA); Tet Hin Yeap, Ottawa (CA); Dafu Lou, Ottawa (CA)

(73) Assignee: BCE Inc., Verdun, Quebec (CA)

( * ) Notice: Subject to any disclaimer, the term of this patent is extended or adjusted under 35 U.S.C. 154(b) by 1117 days.

This patent is subject to a terminal disclaimer.

(21) Appl. No.: 11/297,465

(22) Filed: Dec. 9, 2005

(65) Prior Publication Data

US 2006/0161775 A1 Jul. 20, 2006

Related U.S. Application Data

(63) Continuation of application No. PCT/CA2004/002207, filed on Dec. 30, 2004.

(51) Int. Cl.
*H04L 29/06* (2006.01)
*H04L 9/32* (2006.01)
*H04L 9/00* (2006.01)
*H04K 1/00* (2006.01)
*H04K 1/10* (2006.01)
*G01R 31/08* (2006.01)
*G06F 7/04* (2006.01)
*G06F 9/00* (2006.01)

(52) U.S. Cl. .................. 713/171; 713/150; 713/151; 713/153; 380/255; 380/256; 380/257; 380/259; 380/266; 380/270; 380/277; 380/278; 380/279; 380/33; 380/34; 370/227; 370/228; 370/229; 726/2; 726/3; 726/11; 726/12; 726/14; 726/16

(58) Field of Classification Search .......... 370/227–229; 380/255–257, 259, 266, 270, 33–34, 277–279; 713/150, 151, 153; 726/2, 3, 11, 12, 14, 726/16

See application file for complete search history.

(56) References Cited

U.S. PATENT DOCUMENTS 5,307,411 A 4/1994 Anvret et al.

(Continued)

FOREIGN PATENT DOCUMENTS

EP 1 378 821 A2 1/2004

(Continued)

OTHER PUBLICATIONS

Office Action mailed on Feb. 3, 2009 in connection with U.S. Patent Appl. No. 10/673,509.

(Continued)

*Primary Examiner*—Kimyen Vu
*Assistant Examiner*—Darren Schwartz

(57) ABSTRACT

The present invention provides a method and system for secure access to computer equipment. An embodiment includes a secure access controller connected to a link between a transceiver (such as a modem) and the computer equipment. Public and private keys are used by the secure access controller and a remote user. The keys are provided to the secure access controller by an authentication server. Once the transceiver establishes a communication link with the user, the access controller uses these keys to authenticate packets issued by the user to the computer equipment. If the packet is authenticated, the access controller passes the packet to the computer equipment. Otherwise, the packet is discarded. Another embodiment includes a secure access controller having a plurality of ports for connection to a plurality of different pieces of computer equipment. The secure access controller thus intermediates communications between the modem and the plurality of different pieces of computer equipment.

27 Claims, 10 Drawing Sheets

U.S. PATENT DOCUMENTS

| | | | |
|---|---|---|---|
| 5,587,809 A | | 12/1996 | Le Corre et al. |
| 5,608,778 A | * | 3/1997 | Partridge, III ................ 455/411 |
| 5,724,426 A | * | 3/1998 | Rosenow et al. ............ 713/167 |
| 5,848,161 A | | 12/1998 | Luneau et al. |
| 5,953,422 A | | 9/1999 | Angelo et al. |
| 6,075,860 A | * | 6/2000 | Ketcham .................... 713/159 |
| 6,262,421 B1 | | 7/2001 | Tran |
| 6,324,271 B1 | | 11/2001 | Sawyer et al. |
| 6,363,411 B1 | | 3/2002 | Dugan et al. |
| 6,714,893 B2 | | 3/2004 | Busche et al. |
| 7,302,585 B1 | * | 11/2007 | Proudler et al. ............. 713/189 |
| 7,395,549 B1 | * | 7/2008 | Perlman et al. ................ 726/10 |
| 2001/0034717 A1 | | 10/2001 | Whitworth |
| 2002/0095573 A1 | | 7/2002 | O'Brien |
| 2003/0012382 A1 | | 1/2003 | Ferchichi et al. |
| 2003/0026433 A1 | | 2/2003 | Matt |
| 2003/0056096 A1 | | 3/2003 | Albert et al. |
| 2003/0095661 A1 | | 5/2003 | Harrison |
| 2003/0163693 A1 | | 8/2003 | Medvinsky |
| 2003/0216144 A1 | * | 11/2003 | Roese et al. ............. 455/456.1 |
| 2004/0133908 A1 | * | 7/2004 | Smith et al. .................... 725/31 |
| 2004/0179690 A1 | * | 9/2004 | Soliman ..................... 380/277 |
| 2005/0071129 A1 | | 3/2005 | Yeap et al. |

FOREIGN PATENT DOCUMENTS

| | | |
|---|---|---|
| GB | 2 384 406 A | 7/2003 |
| JP | 2004056762 A | 2/2004 |
| WO | WO 02/086718 A1 | 10/2002 |
| WO | WO 2004/032416 A1 | 4/2004 |

OTHER PUBLICATIONS

Kaufman et al., "Network Security. Private Communication in a Public World", Second Edition, New Jersey, Prentice Hall PTR, 2002, pp. 227-228.

Office Action mailed on Jan. 10, 2008 in connection with U.S. Appl. No. 10/673,509.

Advisory Action mailed on Mar. 28, 2008 in connection with U.S. Appl. No. 10/673,509.

Office Action mailed on Feb. 22, 2010 in connection with U.S. Appl. No. 10/673,509, 8 pages.

* cited by examiner

SECURE MODEM GATEWAY CONCENTRATOR

CROSS-REFERENCE TO RELATED APPLICATION

This application is a continuation of PCT Patent Application Serial No. PCT/CA2004/002207, entitled <<SYSTEM AND METHOD FOR SECURE ACCESS>>, filed on Dec. 30, 2004 and hereby incorporated by reference herein.

FIELD OF THE INVENTION

The present invention relates generally to computer security and more particularly to a system and method for secure access.

BACKGROUND OF THE INVENTION

Remote access to computer equipment is a rapidly developing trend. It is well known to access computer equipment over a dial-up connection using modems. It is becoming increasingly common to provide remote access via virtual private networks ("VPNs"), directly over digital subscriber line (DSL), cable and other types of high-speed internet links. Remote access can be used for a variety of useful purposes, such as enabling remote maintenance of computer equipment, without the problems associated with dispatching a maintenance person to the site of the computer equipment.

However, enabling remote access to computer equipment renders such equipment vulnerable to attacks from unauthorized persons who accidentally, or illegally, obtain the dial-up address of the computer equipment, and the passwords and other authentication information associated therewith.

The telecommunications industry is an industry with an interest in providing remote access to computer equipment resident at telephone exchange switches and used to operate the telephone exchange. However, the security vulnerabilities of prior art remote access methods has curtailed the development and deployment of remote access for telephone exchange switches.

One proposed means of providing remote access is described in U.S. Pat. No. 5,724,426 to Rosenow et al., which issued on Mar. 3, 1998. Rosenow discloses means for controlling access to computerized system resources to enable each new session to employ different encryption keys derived from multiple random numbers and multiple hidden algorithms without transmitting the keys across a communication line. Although Rosenow has merit, it is not entirely ideal for telephone exchange switches, because Rosenow relies on a central access control system that employs a dedicated parallel control network, such as a local area network ("LAN"), to centrally manage access control tables of an access-controlled system of resources.

Another proposed means for providing remote access is described in U.S. patent application Publication No. US2002/0095573 to O'Brien and published on Jul. 18, 2002. O'Brien describes an apparatus in which a secure access transceiver (i.e. modem) is provided for enforcing authenticated remote access to command controllable computer equipment. The secure access transceiver authenticates an entity seeking access to the computer equipment from a remote service point upon detection of a carrier signal during an initial handshake sequence. A data port on the secure access transceiver used to deliver data to the command controllable computer equipment is enabled only on authentication of the entity seeking access to the computer equipment and the data port is kept disabled otherwise, preventing data transfer through the secure access transceiver unless an authenticated connection is established. Although this system also has its place in certain applications, it does not provide an optimal solution for the need to enforce control over access to command controllable computer equipment because after a data port is enabled, and if protective measures have not been taken, the equipment is still vulnerable to attacks. Thus, an unauthorized user will have remote access to the command controllable computer equipment. In general, O'Brien assumes that the network providing the connection cannot be tampered with during the duration of the transaction after the initial authentication process.

Overall, the above-mentioned prior art to provide remote access to computer equipment is not suitable for certain applications.

SUMMARY OF THE INVENTION

It is an object of the present invention to provide a novel system and method for secure access that obviates or mitigates at least one of the above-identified disadvantages of the prior art.

According to an aspect of the invention there is provided a system for secure access comprising an authentication server, a client and an access controller interconnectable for communications therebetween. The authentication server can deliver a first key to the client. The access controller can store a second key complementary to the first key for encrypting at least a portion of communications between the client and the controller.

The access controller includes a plurality of ports each connectable to a computer. The access controller can associate the second key with one of the ports. The access controller can pass instructions received from the client to the computer respective to the one of the ports according to a verification protocol utilizing the keys.

The authentication server can generate the first key and the second key and can deliver the second key to the access controller. The communications between the client and the access controller can be carried via the authentication server. The first key can be a public encryption key and the second key can be a private encryption key complementary to the public encryption key.

The authentication server and the client can be interconnected by a first communication medium and the access controller and the client can be interconnected by a second communication medium. The media can be selected from the group of networks consisting of an Intranet, the Internet, the PSTN, a local area network, and a wireless network. The computer that is connectable to the ports can be a telecommunications switch.

The verification protocol used can include a generation of a random number by the client, an encryption of the random number by the client using the first key, a delivery of the random number and the encrypted random number from the client to the access controller, a decryption of the encrypted number using the second key by the access controller, a comparison of the random number and the decrypted number, and a decision to pass at least a portion of the instructions to the respective computer via the one of the ports if the comparison finds a match of the random number with the decrypted number, and a decision not to pass the at least a portion of the instruction if no match is found.

The instruction can be encrypted by the client using the first key and the verification protocol can be based on a successful decryption of the instruction by the access controller using the second key.

The first key can be delivered to the client only if a user operating the client authenticates the user's identity with the server. Where the authentication server generates the first and second keys, the first key can be delivered to the client only after the second key has been successfully passed to the access controller. Where the authentication server generates the first and second keys, the access controller can contain a preset second key and the server can maintain a record of the preset second key. The server can generate the keys only if the access controller successfully transmits the preset second key to the server and the transmitted preset second key matches the server's record thereof.

According to another aspect of the invention there is provided an access controller for intermediating communications between an interface and a port. The access controller can store a second key complementary to a first key. The access controller can communicate with a client via the interface and with a computer via the port. The client can store the first key and receive instructions from a user. The access controller can selectively pass the instructions to the computer via the port if a verification protocol utilizing the keys is met.

The access controller can obtain the second key from an authentication server, the client can obtain the first key from the authentication server, and the authentication server can generate the first key and the second key.

The first key can be a public encryption key and the second key can be a private encryption key complementary to the public encryption key.

The medium for connecting the interface and the client can be at least one of an RS-232 link, a TTY link, a USB cable, the Internet, an Intranet, a VPN, the PSTN, a local area network, a wireless network, IPSec, PEAP, and TLS. The medium for connecting the port and the computer can be at least one of an RS-232 link, a TTY link, a USB cable, the Internet, an Intranet, a VPN, the PSTN, a local area network, a wireless network, IPSec, PEAP, and TLS. The computer in communication with the client can be a telecommunications switch.

The verification protocol can include a generation of a random number by the client, an encryption of the random number by the client using the first key, a delivery of the random number and the encrypted random number from the client to the access controller, a decryption of the encrypted number using the second key by the access controller, a comparison of the random number and the decrypted number, and a decision to pass at least a portion of the instructions to the computer via the port if the comparison finds a match of the random number with the decrypted number, and a decision not to pass the at least a portion of the instruction if no match is found. The instruction can be encrypted by the client using the first key and the verification protocol can be based on a successful decryption of the instruction by the access controller using the second key.

The first key can be delivered to the client only if a user operating the client authenticates the user's identity with the server. Where the authentication server generates the first and second keys, the first key can be delivered to the client only after the second key has been successfully delivered to the access controller.

Where the authentication server generates the first and second keys, the access controller can contain a preset second key and the server can maintain a record of the preset second key. The server can generate the first key and the second key only if the access controller successfully transmits the preset second key to the server and the transmitted preset second key matches the server's record thereof.

According to another aspect of the invention there is provided, in an authentication server, a method of delivering a first key for securing access between a client having temporary connection to a computer via an access controller having a plurality of ports. The access controller has a second key complementary to the first key. The access controller is connected to the computer via one of the ports and can selectively pass instructions received from the client to the computer via the one of the ports if a verification protocol utilizing the keys is met. The method comprises
  receiving a request from the client for the first key;
  authenticating the request; and,
  sending the first key to the client if the request is authenticated.

The method can comprise additionally:
  receiving a request from the access controller for an updated second key;
  authenticating the access controller request;
  generating the updated second key and a first key corresponding to the updated second key if the access controller request is authenticated;
  delivering the updated second key to the access controller;
  receiving a request from the client for the updated first key;
  authenticating the client request; and,
  sending the first key to the client if the client request is authenticated.

According to another aspect of the invention, in an authentication server, a method is provided for generating a set of keys for securing access between a client having temporary connection to a computer via an access controller having a plurality of ports, the access controller connected to the computer via one of the ports, where the access controller can selectively pass instructions received from the client to the computer via the one of the ports if a verification protocol utilizing the keys is met. The method comprises:
  receiving a request from the access controller for an updated first key;
  authenticating the request;
  generating the updated first key and a second key corresponding to the updated first key; and,
  delivering the updated first key to the access controller.

The method can comprising the additional steps of:
  receiving a second request from the client for the second key;
  authenticating the second request;
  delivering the updated first key to the access controller.

The first key can be a public encryption key and the second key can be a private encryption key complementary to the public encryption key.

According to another aspect of the invention a method of securing access between a client connected to a computer via an access controller having a plurality of ports is provided. The access controller can be connected to the computer via one of the ports. The method comprises:
  receiving an instruction at the client destined for the computer;
  generating a random number by the client;
  encrypting the random number by the client using a first key;
  delivering the random number, the encrypted random number and the instruction to the access controller;
  decrypting of the encrypted number using a second key by the access controller, the second key complementary to the first key;

comparing the random number and the decrypted number;
passing at least a portion of the instruction to the computer via the port if the comparison finds a match of the random number with the decrypted number; and,
discarding the at least a portion of the instruction if no match is found.

According to another aspect of the invention there is provided a computer readable medium for storing a plurality of programming instruction in accordance with any of the methods described above.

According to another aspect of the invention, an authentication server is provided. The authentication server comprises an interface for communicating with a client via a communication medium. The authentication server further comprises a processing unit connected to the interface. The processor can deliver a first key to the client. The first key delivered can be used by the client for communicating with an access controller having a second key complementary to the first key. The controller can selectively pass instructions from the client to a computer attached to the controller if a verification protocol utilizing the keys is met. The access controller can include a plurality of ports and the connection to the computer can be via one of the ports.

The interface can be additionally used for communicating with the access controller via the medium. The processing unit can generate the keys and can further deliver the second key to the access controller.

BRIEF DESCRIPTION OF THE DRAWINGS

The invention will now be described by way of example only, and with reference to the accompanying drawings, in which.

DETAILED DESCRIPTION OF THE INVENTION

Figure 1:
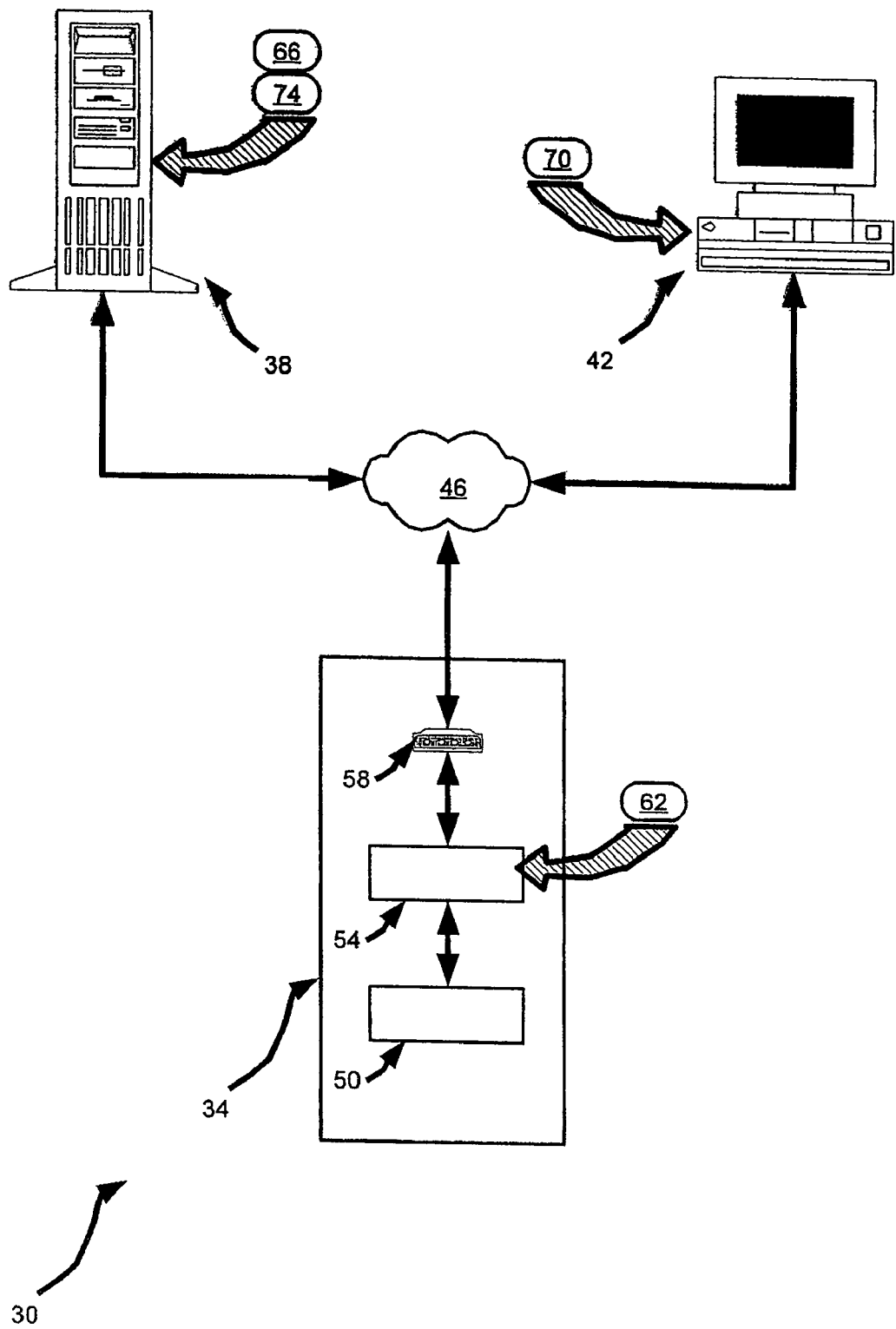
FIG. 1 is a block diagram of a system for secure access in accordance with an embodiment of the invention.

Referring now to FIG. 1, a system for secure access is indicated generally at 30. System 30 is comprised of at least one remote office 34, an authentication server 38 and at least one remote client 42, all interconnected by a network 46. The term "remote" is not to be construed in a limiting sense, and in a present embodiment refers to the different locations of office 34 and client 42 in relation to one or more other components in system 30, and/or to reflect the connection of office 34 and client 42 via network 46.

Remote office 34 is any facility that contains computer equipment that is to be accessed via network 46. In a present embodiment, remote office 34 is a telephone central office and the computer equipment contained therein is a telecommunications switch 50 as is commonly found in the public switched telephone network ("PSTN") that is operable to handle and manage a plurality of telephone connections. Remote office 34 also contains an access controller 54 that is connected to the switch 50. In turn, access controller 54 is connected to a network interface 58 that is complementary to the protocols employed over network 46, and accordingly, network interface 58 is operable to manage communications between network 46 and access controller 54. In a present embodiment, network 46 is the PSTN and network interface 58 is a voice-band modem, but in other embodiments, other types of networks and network interfaces can be employed.

Authentication server 38 is a computing device, (such as a personal computer, a server, or the like) that is typically comprised of hardware suitable for server type functions, and includes a central processing unit, random access memory, hard-disk storage and a network interface for communicating over network 46. As will be explained in greater detail below, authentication server 38 is operable to act as a trusted third party to assist in providing security in communications between client 42 and office 34. In a present embodiment, authentication server is operable to generate a public/private key pair for use in encrypting communications (or a portion thereof) between client 42 and office 34. Authentication server 38 will be described in greater detail below.

Remote client 42 is also a computing device, (such as a personal computer, laptop computer, personal digital assistant, or the like) that is typically comprised of hardware suitable for client-type functions, and includes a central processing unit, random access memory, a long term storage device and a network interface for communicating over network 46. Remote client 42 is operable to utilize the keys generated by authentication server 38 when conducting its communications with switch 50. It is to be understood that the term "client" encompasses a wide range of computing devices that are operable to interact with server 38 and office 34.

Access controller 54 within office 34 is operable to make use of the unique keys generated by authentication server 38 in order to authenticate whether communications with client 42 are authorized, and if so authorized, to pass such communications between switch 50 and client 42, and, if not authorized, to discard such communications. Access controller 54 is provided with a security database 62. When access controller 54 is originally manufactured, security database 62 includes a set-of factory preset containing data in accordance with Table I.

TABLE I

Security Database 62 of Access Controller 54 (Factory Preset)

| Field # | Field | Data |
|---|---|---|
| 1 | Phone Number | 5625800 |
| 2 | Identification Number | xy45678 |
| 3 | Access Controller's Private Key | acPRV(default) |
| 4 | Inactive Expiry Period | 5 days |
| 5 | Time to remain active after disconnect | 2 hours |
| 6 | Date of last change | Jan. 31, 2003 |

TABLE I-continued

Security Database 62 of Access Controller 54 (Factory Preset)

| Field # | Field | Data |
|---|---|---|
| 7 | Time of last disconnect | 23:59:59 |
| 8 | Power up counter | 001 |
| 9 | Authentication Server's Public Key | asPUB |

Describing Table I in greater detail, Field 1, Phone Number, is the phone number on network 46 where network interface 58 can be reached. Generally, Field 1 remains fixed once access controller 58 is deployed in system 30. Field 2, Identification Number, is a unique identification number for access controller 54, and thus any additional access controllers 54 in system 30 would also have their own Identification Number. Generally, Field 2 remains fixed once access controller 58 is deployed in system 30. Field 3, Access Controller's Private Key, is a private key that can be used for encrypting communications with access controller 54 (and in turn switch 50) and thereby provide secure access to switch 50. As shown in Table I, access controller 54 is initially provided with a factory preset private key and is identified in Table I as "acPRV(default)". Thus, as will be explained in greater detail below, Field 3 will be updated from time to time in order to help provide ongoing secure access to switch 50.

Continuing with describing Table I in greater detail Field 4, Inactive Expiry Period is a time duration that can be used to terminate the validity of particular Access Controller Private Key, and thereby force an update of that key. Field 5, Time to Remain Active After Disconnect, is a period after which a remote client 42 disconnects from access controller 54 that a particular Access Controller Private Key remains valid, in the event that a particular remote client 42 wishes to reestablish communications within that time period after disconnecting from access controller 54. Field 6, Date of Last Change, is a date stamp of when the records in database 62 were last updated, and in particular, when Access Controller Private Key was last updated. Field 6 can be used by in conjunction with Field 4 to determine whether an update to Access Controller Private Key is to be performed. Field, 7, Time of Last Disconnect is a time stamp of when a particular remote client 42 last disconnected from access controller 54, to be used in conjunction with Field 5 to determine whether an update to Access Controller Private Key is to be performed.

Field 8, Power up counter, is a software counter in firmware of access controller 54 to count how many times access controller 54 has been shut-down and re-powered. An administrator that keeps separate track of the counter can monitor any tampering of access controller 54, in the event an unauthorized individual attempts to shut-down and then re-power the access controller 54. Additionally, the power up counter can be also set up to detect if access controller 54 has been disconnected, or put off-line from the remainder of system 30.

Field 9, Authentication Server's Public Key, asPUB, is a public key that can be used for encrypting communications with authentication server 38.

By the same token, authentication server 38 also includes an access controller database 66 that includes data that corresponds with the information stored in security database 62 (and also includes additional data that corresponds with information stored in security databases respective to any other access controllers that may be present in system 30). Those initial settings of authentication server database 66 are shown in Table II.

TABLE II

Security Database 66 of Authentication Server 38

| Record # | 1 | | |
|---|---|---|---|
| Field 1 | Phone Number (Stores Field 1 of Table I) | 5625800 |
| Field 2 | Identification Number (Stores Field 2 of Table I) | xy45678 |
| Field 3 | Access Controller's Public Key | acPUB(default) |
| Field 4 | Access Controller's Private Key (Stores Field 3 of Table I) | acPRV(default) |
| Field 5 | Expiry Period (Stores Field 4 of Table I) | 5 days |
| Field 6 | Time to remain active after disconnect (Stores Field 5 of Table I) | 2 hours |
| Field 7 | Power up counter (Stores Field 8 of Table I) | 001 |
| Field 8 | Authentication Server's Private Key | asPRV |

Table II shows one record, labelled Record 1, which reflects information corresponding to access controller 58. Thus, Fields 1, 2, 4, 5, 6 and 7 of Table II store the same information as Fields 1, 2, 3, 4, 5 and 8 of Table I, respectively. Table II also includes a Field 3, Access Controller's Public Key, which corresponds to the factory preset private key in Field 4, and is identified in Table II as "acPUB(default)". Field 8, Authentication Server's Private Key, corresponds to the key in Field 4, and is identified in Table II as "asPRV". While not shown herein, Table II can also store additional records for any additional access controllers that are included in system 30.

Figure 2:
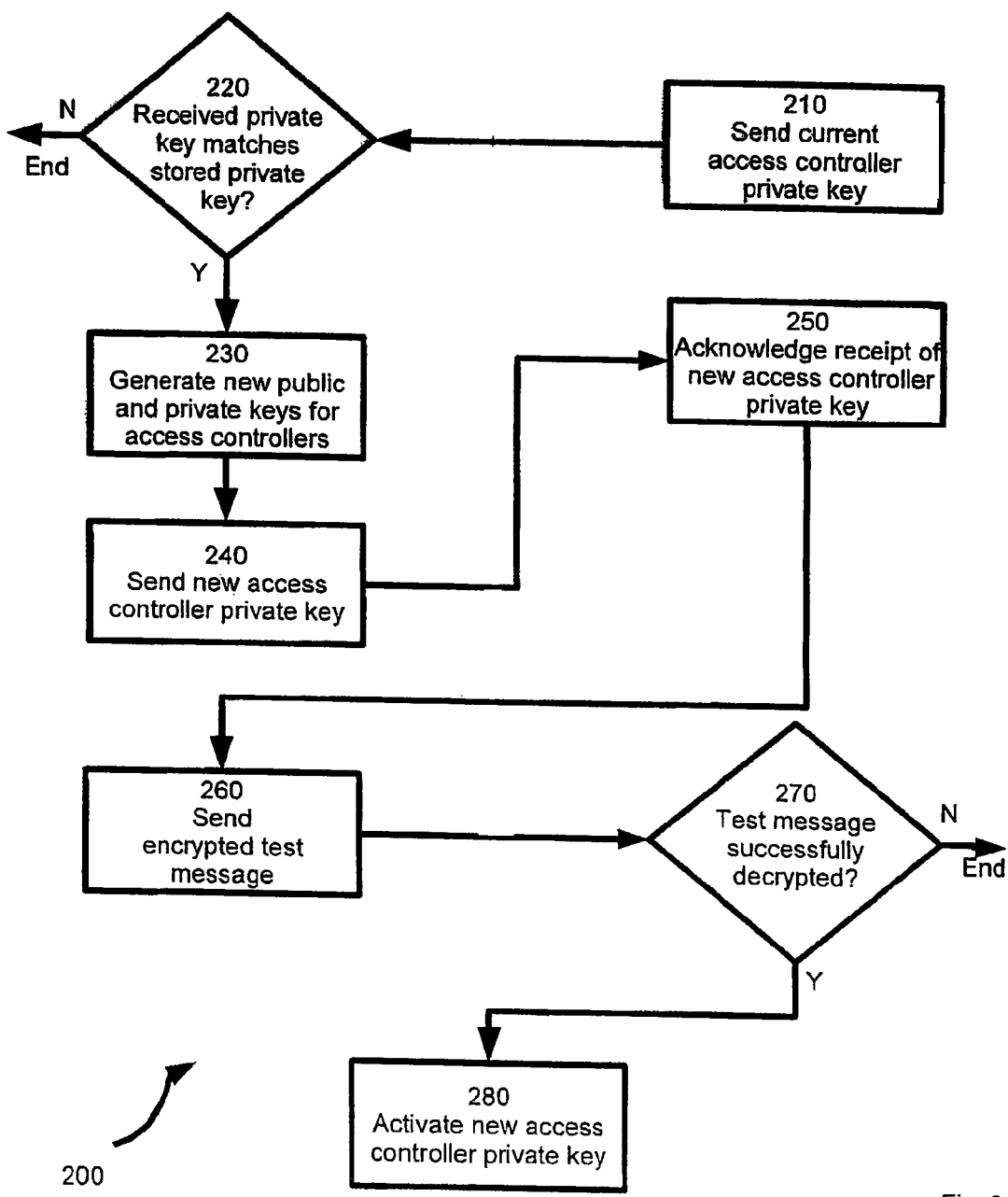
FIG. 2 is a flow chart showing a method of updating encryption keys for the access controller of FIG. 1 in accordance with another embodiment of the invention.

Referring now to FIG. 2, a method for updating an access controller's encryption keys is indicated generally at 200. In order to assist in the explanation of the method, it will be assumed that method 200 is operated using system 30. Furthermore, the following discussion of method 200 will lead to further understanding of system 30 and its various components. (However, it is to be understood that system 30 and/or method 200 can be varied, and need not work exactly as discussed herein in conjunction with each other, and that such variations are within the scope of the present invention.)

At step 210, the current access controller private key is sent from the access controller to the authentication server. The access controller key is encrypted at access controller 54 using the authentication server's public key asPLB, and decrypted by authentication server 38, using the private key asPRV, thus establishing secure communication of the current access controller private key between access controller 54 and authentication server 38. Accordingly, access controller 54 retrieves its Access Controller's Private Key, from its security database 62. Using the data listed in Table I as an example, the Access Controller's Private Key stored in access controller 54 is currently set to "acPRV(default)". The retrieved key is sent to authentication server 38 via network 46.

At step 220, it is determined whether the received access controller private key matches the stored access controller private key. Thus, authentication server 38, upon receipt of the key sent at step 210, will compare the received access controller private key with the access controller private key associated with access controller 50 by examining the contents of security database 66. If a match is found between the received access controller private key (i.e. "acPRV(default)") and the access controller private key stored Field 4 of Table II (i.e. "acPRV(default)"), then a match is found and method 200 will advance to step 230—otherwise method 200 ends due to a perceived security breach. Method 200 can begin anew in the event that such mismatch was merely a communications error.

At step 230, a new public and private key pair for the access controller is generated. Thus, authentication server 38 will perform a predefined operation to generate a new access controller private key (represented herein as "acPRV(new)") and a new access controller public key (represented herein as "acPUB(new)").

At step 240, the new access controller private key generated at step 230 is sent to the access controller. The new access controller private key is encrypted at authentication server 38 using the old public key of access controller 54, and decrypted by access controller 54, using the old access controller private key, thereby establishing secure communication of the new access controller private key between authentication server 38 and access controller 54. The new access controller private key, acPRV(new), will thus be sent via network 46 back to access controller 54.

At step 250, receipt of the new access controller private key is acknowledged. Thus, access controller 54, upon receipt of new access controller private key, acPRV(new) sent at step 240, will acknowledge such receipt to authentication server 38.

At step 260, an encrypted test message is sent. Authentication server 38 will prepare a known-test message, such as the text string "OK", and encrypt that message using new access controller public key, acPRV(pub), and send that encrypted test message to access controller 54.

At step 270, access controller 54 will attempt to decrypt the encrypted test message using new access controller private key, acPRV(new), and if the decryption is unsuccessful, the method will end, and at this point, it can be desired to start method 200 anew and re-attempt the update. If, however, the decryption is successful, and access controller 54 successfully recovers the known-test message (i.e. the text string "OK"), then the method advances to step 280.

At step 280, the new access controller private key is activated. Thusly, access controller 54 will update security database 62 to store new access controller private key with acPRV(new). Similarly, authentication server 38 will update its security database 66 to reflect both the new access controller private key and the new access controller public key. Table III shows the contents of security database 62 after the performance of step 280.

TABLE III

Security Database 62 of Access Controller 54

| Field # | Field | Data |
|---|---|---|
| 1 | Phone Number | 5625800 |
| 2 | Identification Number | xy45678 |
| 3 | Access Controller's Private Key | acPRV(new) |
| 4 | Inactive Expiry Period | 5 days |
| 5 | Time to remain active after disconnect | 2 hours |
| 6 | Date of last change | Feb. 1, 2003 |
| 7 | Time of last disconnect | 23:59:59 |
| 8 | Power up counter | 001 |
| 9 | Authentication Server's Public Key | asPUB |

In particular, note that in Table III, Field 3, Access Controller Private Key is updated to "acPRV(new)", while date of last change was changed from Jan. 31, 2003, to Feb. 1, 2003, assuming a hypothetical date of the performance of method 200 to be on Feb. 1, 2003.

Table IV shows the contents of security database 66 after the performance of step 280.

TABLE IV

Security Database 66 of Authentication Server 38

Record # 1

| Field 1 | Phone Number (Stores Field 1 of Table III) | 5625800 |
|---|---|---|
| Field 2 | Identification Number (Stores Field 2 of Table III) | xy45678 |
| Field 3 | Access Controller's Public Key | acPUB(new) |
| Field 4 | Access Controller's Private Key (Stores Field 3 of Table III) | acPRV(new) |
| Field 5 | Expiry Period (Stores Field 4 of Table III) | 5 days |
| Field 6 | Time to remain active after disconnect (Stores Field 5 of Table III) | 2 hours |
| Field 7 | Power up counter (Stores Field 8 of Table III) | 001 |
| Field 8 | Authentication Server's Private Key | asPRV |

In particular, note that in Table IV, Field 3, Access Controller Public Key is updated to "acPUB(new)", while Field 4, Access Controller Private Key is updated to "acPRV(new)".

At this point, method 200 terminates. Method 200 can be executed from time to time to update the access controller encryption keys and thereby enhance the overall security of system 30.

Other embodiments of the present invention provide means for making the access controller public key available to client 42 so that secure access between client 42 and switch 50 can be effected. Referring again to FIG. 1, client 42 thus also includes its own security database 70, which is mirrored by an additional security database 74 stored in authentication server 38.

When client 42 is originally configured, security database 70 appears in accordance with Table V.

TABLE V

Security Database 70 of Client 42

| Field # | Field | Data |
|---|---|---|
| 1 | Name | Joe Smith |
| 2 | UserID | 1234 |
| 3 | Password | b56789xx |
| 4 | Access Controller Identification Number | <Empty> |
| 5 | Access Controller Public Key | <Empty> |
| 6 | Remote Office Phone Number | <Empty> |

Describing Table V in greater detail, Field 1, Name, is the name of the particular user that owns or is in possession of client 42, and in this particular example is "Joe Smith". It is thus assumed that Joe Smith is an individual or employee who is intended to have access to switch 50. Generally, Field 1 remains fixed. Field 2, UserID, is a unique identifier assigned to Joe Smith, in this example, "1234". Similarly, Field 3, Password, is a second unique identifier assigned to Joe Smith, in this example, "b56789xx". UserID and Password are assigned to Joe Smith in any known manner as may be desired, and are typically provided to Joe Smith, in person, so that as the user of client 42 Joe Smith can populate Fields 2 and 3 of security database 70 through a user interface on client 42.

Continuing with describing Table V, Field 4, Access Controller Identification Number, and Field 5, Access Controller Public Key and Field 6, Remote Office Phone Number are initially blank, and client 42 is operable to communicate with authentication server 38 in order to populate those fields, as will be explained in greater detail below.

By the same token, security database 74 appears in authentication server 38 accordance with Table VI.

TABLE VI

Security Database 74 of Authentication Server 38

| Record # | Field 1<br>Name<br>(Field 1 of<br>Table V) | Field 2<br>User ID<br>(Field 2 of<br>Table V) | Field 3<br>Password<br>(Field 3 of Table<br>V) |
|---|---|---|---|
| 1 | Joe Smith | 1234 | b56789xx |

Table VI shows one record, labelled Record 1, which reflects information corresponding to the user of client 42. Thus, Fields 1, 2, and 3 of Table VI store the same information as Fields 1, 2, and 3, of Table V, respectively. While not shown herein, Table VI can also store additional records for any additional clients 42 that are included in system 30.

Figure 3:
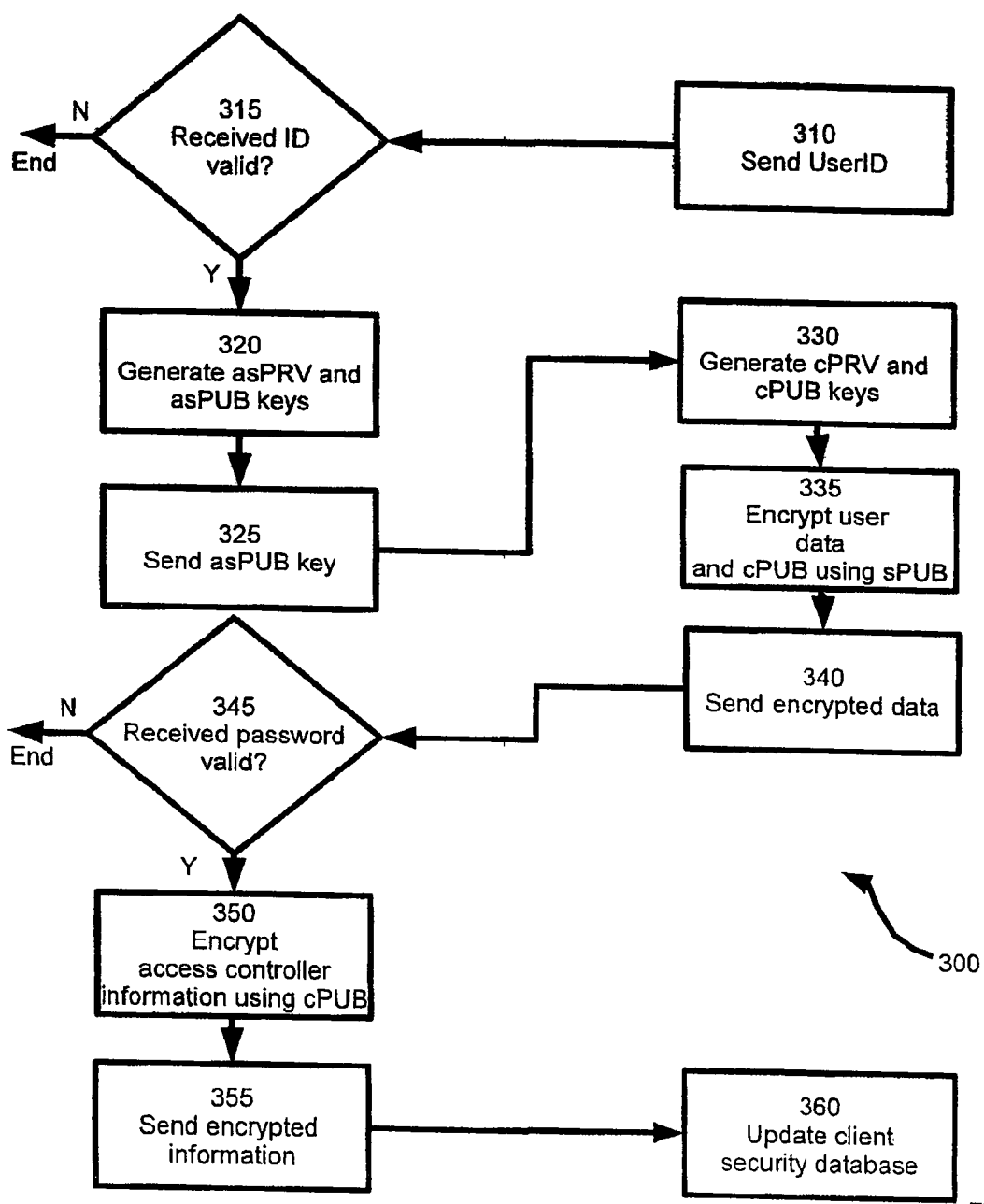
FIG. 3 is a flow chart showing a method of updating encryption keys for the client of FIG. 1 in accordance with another embodiment of the invention.

Referring now to FIG. 3, a method for updating a client security database is indicated generally at 300. In order to assist in the explanation of the method, it will be assumed that method 300 is operated using system 30. Furthermore, the following discussion of method 300 will lead to further understanding of system 30 and its various components. (However, it is to be understood that system 30 and/or method 300 can be varied, and need not work exactly as discussed herein in conjunction with each other, and that such variations are within the scope of the present invention.)

Beginning at step 310, the UserID of the user of client 42 is sent to authentication server 38. This is performed in system 30 via network 46, and when client 42 establishes a connection with authentication server 38, client 42 accesses security database 70, and sends the UserID "1234" over network 46 to authentication server 38.

Next, at step 315, authentication server 38 makes a determination as to whether this UserID is valid. To make such a determination, authentication server 38 accesses its security database 74 and looks for a corresponding UserID. If no valid corresponding UserID exists in database 74, the method ends. If such a valid UserID does exist, the method advances to step 320.

At step 320, authentication server 38 generates a one-time pair of private and public keys, identified herein as "asPRV" and "asPUB" respectively. At step 325, public key asPUB is sent over network 46 to client 42.

At step 330, client 42 will receive public key asPUB sent at step 325, and client 42 will generate its own one-time pair of private and public keys, identified herein as "cPRV" and "cPUB" respectively. At step 335, client 42 retrieves, from security database 70, the data contained in Fields 1-3 of Table V, namely, the Name, UserID and Password respective to that client 42. Also at step 335, the retrieved data is combined with public key cPUB, and the complete combination is encrypted using public key asPUB. At step 340, the encrypted combination of data is sent to authentication server 38 via network 46.

At step 345, authentication server 38 receives the data sent at step 340 and decrypts it using private key asPRV, and makes a determination as to whether the password it received is valid for client 42. Such a determination is made by ensuring that the received Name, UserID and Password correspond with the expected data found in security database 74. If it is not valid, then the method ends, however, if it is valid, then the method advances to step 350.

At steps 350 and 355, the access controller information needed by client 42 for secure access to remote office 34 is encrypted using public key cPUB and then sent to client 42. The access controller information is obtained by authentication server 38 which retrieves the relevant information from security database 66, which in the present example is Fields 1, 2 and 3 of Record 1 of Table IV, namely, the Phone Number (i.e. 5625800) of access controller 54, the Identification Number (i.e. xy45678) of access controller 54, and the Public Key of access controller 58 (i.e. acPUB(new)). This information is encrypted using public key cPUB, and then sent to client 42.

At step 360, client receives the encrypted information sent at step 355, and decrypts that information using private key cPRV, and updates database 70 with that decrypted information. Thus, once step 360 is performed, security database 70 appears in accordance with Table VII.

TABLE VII

Security Database 70 of Client 42

| Field # | Field | Data |
|---|---|---|
| 1 | Name | Joe Smith |
| 2 | UserID | 1234 |
| 3 | Password | b56789xx |
| 4 | Access Controller Identification Number | xy45678 |
| 5 | Access Controller PublicKey | acPUB(new) |
| 6 | Remote Office Phone Number | 5625800 |

Figure 4:
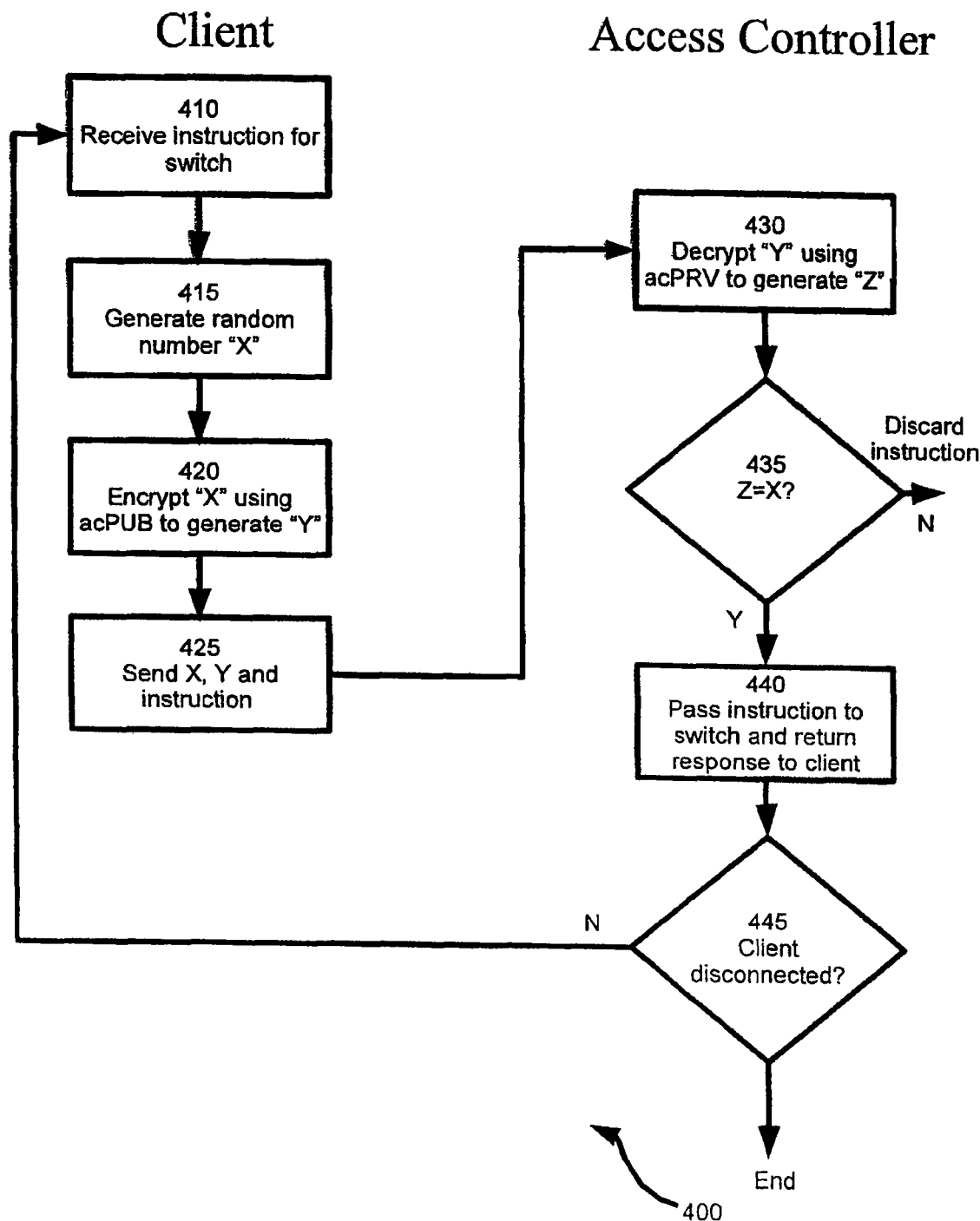
FIG. 4 is a flow chart showing a method for secure access in accordance with another embodiment of the invention.

Having so populated security database 70 using method 300, client 42 is now operable to securely access switch 50 in central office 34. Referring now to FIG. 4, a method for secure access is indicated generally at 400. In order to assist in the explanation of the method, it will be assumed that method 400 is operated using system 30. Furthermore, the following discussion of method 400 will lead to further understanding of system 30 and its various components. (However, it is to be understood that system 30 and/or method 400 can be varied, and need not work exactly as discussed herein in conjunction with each other, and that such variations are within the scope of the present invention.) Before discussing the method, it is assumed that methods 200 and 300 have been previously performed, and that client 42 has established communications with network interface 58 and access controller 54 client 42 having the phone number of office 34 and the identification number of access controller 54 available by retrieving such information from security database 70.

Beginning at step 410, client 42 receives an instruction destined for switch 50. Such an instruction can be any type of command, data, user-input, information or the like that is generated by client 42 and is destined for switch 50, as part of the function or task that is being performed by virtue of client 42 establishing a connection to office 34.

At step 415, client 42 generates a random number, referred to herein as "X". At step 420, random number "X" is encrypted using access controller public key acPUB(new), such key having been retrieved from security database 70. The encrypted version of random number "X" is referred to herein as "Y". At step 425, "X", "Y" and the instruction received at step 410 are sent to access controller 54 via network 46. The format in which this transmission occurs is not particularly limited, and can be in the form of a packet, a plurality of packets, a portion of a packet, as desired.

At step 430, access controller 54 decrypts "Y" that was sent at step 425, to generate "Z". Access controller 54 uses private key acPRV(new), such private key having been retrieved from security database 62.

At step 435, access controller 54 determines whether "X" matches "Z", "X" having been received directly from client 42, and "Z" having been generated at step 430. If no match is found, then the instruction is discarded due to a perceived breach in security. Method 400 can then begin anew to attempt to resend the lost instruction, or, access controller 54 can simply terminate method 400 and sever communications with client 42. However, if "Z"="X", then the method advances to step 440.

At step 440, the instruction destined for switch 50 is passed thereto by access controller 54, and any response generated by switch 50 is passed back to client 42 and processed by client 42 accordingly.

At step 445, it is determined whether client 42 has disconnected from network interface 58, and, if so, the method ends. If not, method 400 returns to step 410.

Figure 5:
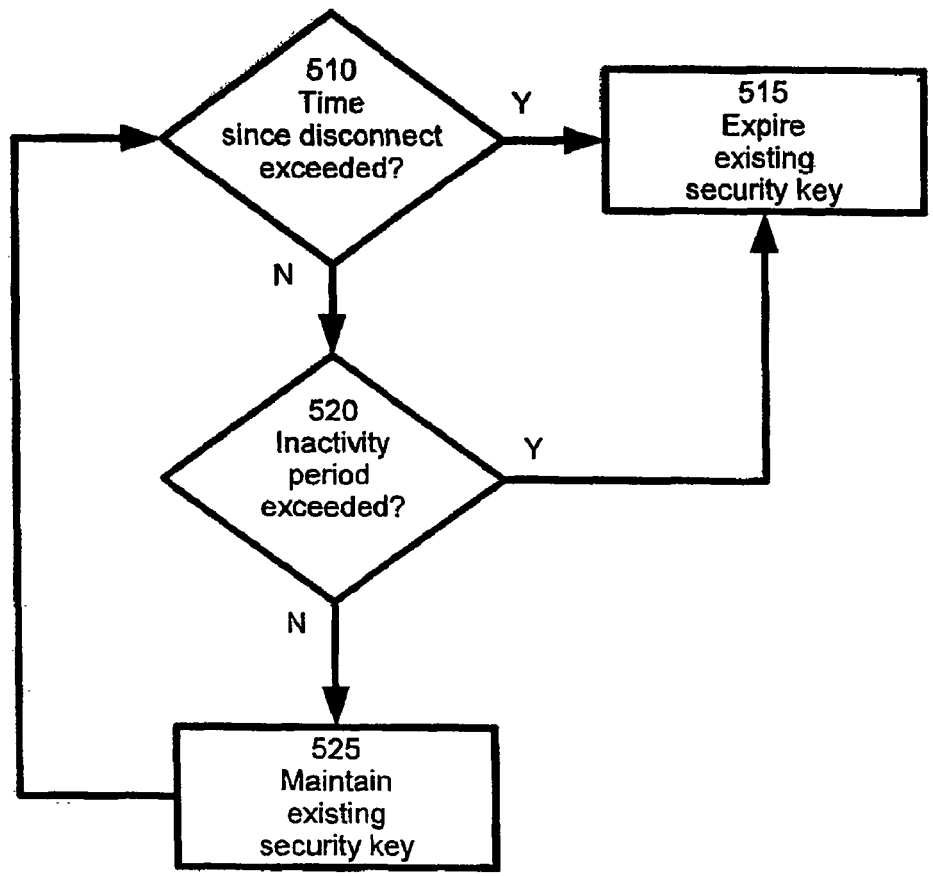
FIG. 5 is a flow chart showing a method of expiring encryption keys used in the system of FIG. 1 in accordance with another embodiment of the invention.

Referring now to FIG. 5, a method of expiring an access controller security key is indicated generally at 500. The execution of method 500 occurs in access controller 54, typically, after the execution of method 200 and during any period when there is no connection between client 42 and controller 54. At step 510, a determination is made as to whether the time since a disconnect between client 42 and controller 54 has been exceeded. For example, assuming method 400 has been conducted, but terminated, then the time since such termination is measured, and if the such time period exceeds the maximum prescribed period in security database 62 (such period being two hours per Field 5, Table III, "Time to remain active after disconnect") then the method will advance to step 515 and the access controller private key acPRV(new) will be deemed expired, and access controller 54 will need to execute method 200 to obtain another private key acPRV, and client 42 will then need to execute method 300 to obtain the corresponding public key acPUB. However, if the time period has not been exceeded, or method 400 has never been executed so no connection has ever actually been effected between client 42 and controller 54 since the last time controller 54 obtained a private key acPRV, then the method advances to step 520.

At step 520, a determination is made as to whether the time period during-which no connection has been effected between client 42 and controller 54 has been exceeded. For example, assuming that method 400 has never been performed since access controller 54 executed method 200, if such time period exceeds the maximum prescribed period in security database 62 (such period being five days per Field 4, Table III, "Inactivity Expiry Period" then the method will advance to step 515 and the access controller private key acPRV(new) will be deemed expired, and access controller 54 will need to execute method 200 to obtain another private key acPRV, and then client 42 will then need to execute method 300 to obtain the corresponding public key acPUB. However, if the time period has not been exceeded, then the method returns to step 510.

It should be understood that method 500 is performed on an ongoing basis by access controller 54 any time that access controller 54 has executed method 200 and until a particular key has been expired at step 515. It should also be understood that, in variations on method 500, only one of step 510 or step 520 can be used, omitting the other step.

Figure 6:
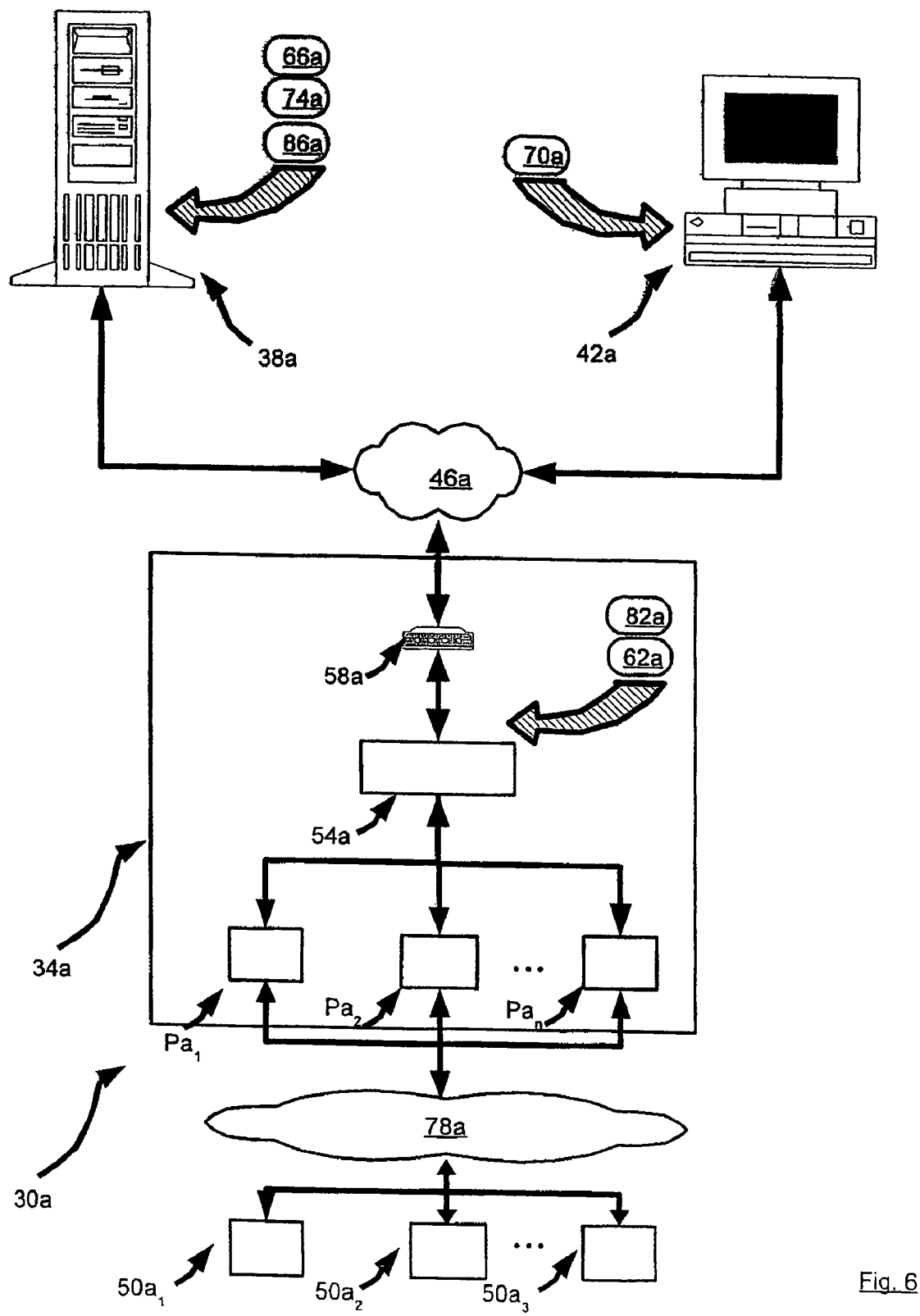
FIG. 6 is a block diagram of a system for secure access in accordance with another embodiment of the invention.

Referring now to FIG. 6, a system for secure access in accordance with another embodiment of the invention is indicated generally at 30a. System 30a is substantially the same as system 30, and like elements in system 30a bear the same reference as like elements in system 30, except followed by the suffix "a". System 30a differs from system 30 in that system 30a comprises a plurality of switches 50a, through 50a, (generically referred to herein as "switch 50a" and collectively as "switches 50a") in contrast to system 30's single switch 50. Switches 50a are located remotely from access controller 54a and communicate with access controller 54a through a network 78a and via respective ports $Pa_1$ through $Pa_n$ (generically referred to herein as "port Pa" and collectively as "ports Pa"). The term "located remotely" is not to be construed in a limiting sense, and in a present embodiment refers to the different locations of switches 50a and access controller 54a in relation to one another, and/or to reflect the connection of switches 50a and access controller 54a via network 78a.

In a present embodiment, network 78a is an intranet, i.e. a private Internet (but could also be any other type of network). In a present embodiment, network 78a comprises of access controller 54a and switches 50a, all operable to communicate using The Institute of Electrical and Electronics Engineers standard Ethernet 802.3-2002. Each switch 50a is assigned an internet protocol (IP) address reserved for use in Intranets according to RFC 1918—Address Allocation for Private Internets as described by the Network Working Group of Internet Engineering Task Force (IETF). According to this embodiment, only access controller 54a is directly visible to network 46a. In other embodiments, however, different members of the Intranet could also be visible directly to network 46a.

Also in a present embodiment, ports Pa are implemented as virtual ports by equating an identifier representing each port ("port identifier") with each switch 50a. This information is stored in a look up table (LUT) 82a by access controller 54a. As shown in Table VIII, LUT 82a associates each port identifier Pa with an identifier respective to each switch 50a, as well as the actual IP address of each switch 50a.

TABLE VIII

Example of a LUT 82a of Access Controller 54a

| Port Identifier | Switch 50a Identifier | Switch 50a IP Address |
|---|---|---|
| $Pa_1$ | s12345 | 192.168.24.005 |
| $Pa_2$ | s12346 | 192.168.24.006 |
| $Pa_n$ | s12347 | 192.168.24.007 |

Thus, according to LUT 82a, port $Pa_1$ is in communication with switch 50a identified as s12345, located at IP address 192.168.24.005. Thereof someone skilled in the art will recognize that IP addresses starting with 192.168 are reserved for private intranet use.

It should now be apparent to those skilled in the art that LUT 82a can be populated and updated in a variety of ways. For example, LUT 82a can be populated and periodically updated manually by an operator if the IP addresses associated with switches 50a are static.

In its communications with access controller 54a, client 42a includes the identifier for the destination switch 50a. When access controller 54a receives instructions from client 42a, access controller 54a translates the included identifier to the appropriate IP address using LUT 82a and the communications are routed to switch 50a accordingly. Conversely, when access controller 54a receives instructions from switch 50a for client 42a, access controller 54a is operable to forward the communication to client 42a.

Access controller 54a is provided with security database 62a which, in contrast to security database 62, includes a separate record for each port Pa containing a private key for decrypting communications from client 42a directed to that particular port Pa. When access controller 54a is originally manufactured, security database 62a includes a set of factory preset containing data in accordance with Table IX which shows an individual record for port $Pa_1$. It will be understood that similar records are also stored in access controller for remaining ports $Pa_2$ and $Pa_n$.

TABLE IX

An Example Record of Security Database 62a of Access Controller 54a (Factory Preset) for Port $Pa_1$

| Record #1 | Field # | Field | Data |
|---|---|---|---|
| | 1 | Phone Number | 5625800 |
| | 2 | Identification Number of Access Controller | xy45678 |
| | 3 | Port $Pa_1$'s Private Key | Pa1PRV(default) |
| | 4 | Inactive Expiry Period | 5 days |
| | 5 | Time to remain active after disconnect | 2 hours |
| | 6 | Date of last change | Jan. 31, 2003 |
| | 7 | Time of last disconnect | 23:59:59 |
| | 8 | Power up counter | 001 |
| | 9 | Authentication Server's Public Key | asPUB |

Describing Table IX in greater detail, Field 1, Phone Number, is the phone number on network 46a where network interface 58a can be reached. Generally, Field 1 remains fixed once access controller 58a is deployed in system 30. Field 2, Identification Number, is a unique identification number for access controller 54a, and thus any additional access controllers 54a in system 30a would also have their own Identification Number. Generally, Field 2 remains fixed once access controller 58a is deployed in system 30a. Field 3, Port $Pa_1$'s Private Key, is a private key that can be used for encrypting communications with access controller 54a (and in turn port $Pa_1$) and thereby provide secure access to switch 50a. As shown in Table IX, access controller 54a is initially provided with a factory preset private key for each port and is identified in Table XI as "Pa1PRV(default)" for port $Pa_1$. Thus, as will be explained in greater detail below, Field 3 will be updated from time to time in order to help provide ongoing secure access to switch 50a.

Continuing with describing Table IX in greater detail, Field 4, Inactive Expiry Period, is a time duration that can be used to terminate the validity of port $Pa_1$'s Private Key, and thereby force an update of that key. Field 5, Time to Remain Active After Disconnect, is a period after which a remote client 42a disconnects from access controller 54a that a Port $Pa_1$'s Private Key remains valid, in the event that a particular remote client 42a wishes to reestablish communications within that time period after disconnecting from access controller 54a. Field 6, Date of Last Change, is a date stamp of when the particular record in database 62 was last updated, and in particular, when Port $Pa_1$'s Private Key was last updated. Field 6 can be used by in conjunction with Field 4 to determine whether an update to Port $Pa_1$'s Private Key is to be performed. Field, 7, Time of Last Disconnect is a time stamp of when a particular remote client 42a last disconnected from access controller 54a, to be used in conjunction with Field 5 to determine whether an update to Port $Pa_1$'s Private Key is to be performed.

Field 8, Power up counter, is a software counter in the firmware of access controller 54a to count how many times access controller 54a has been shut-down and re-powered. An administrator that keeps separate track of the counter can monitor any tampering of access controller 54a, in the event an unauthorized individual attempts to shut-down and then re-power the access controller 54a Additionally, the power up counter can be also set up to detect if access controller 54a has been disconnected, or put off-line from the remainder of system 30a.

Field 9, Authentication Server's Public Key, asPUB, is a public key that can be used for encrypting communications with authentication server 38.

Authentication server 38a includes a database 86a consisting of a record. As shown in Table X, database 86a is substantially the same as LUT 82a, except that database 86a contains the identifier of the access controller to which the LUT information belongs.

TABLE X

An example record of database 86a of Authentication Server 38a

| Access Controller Identification Number | Port Identifier | Switch 50a Identifier |
|---|---|---|
| xy45678 | <Empty> | <Empty> |
| | <Empty> | <Empty> |
| | <Empty> | <Empty> |

The field titled "Access Controller Identification Number" contains the identifier of the access controller from which the information in this record originates (i.e. access controller 54a). The fields titled "Port Identifier" contain the port identifiers of each port found on access controller 54a. The fields titled Switch 50a Identifier contain each Switch 50a that is in communication with each port Pa. Authentication server 38a is operable to update the contents of the empty fields of database 86a through communications with authentication server 54a. It should now be apparent to those skilled in the art that Table X can also store additional records for any access controllers included in system 30a that are in addition to access controller 54a.

Authentication server 38a also includes a database 66a that is substantially the same as database 66. However, database 66a includes the keys associated with each port Pa in contrast to database 66 which includes keys associated with access controller 54. The first record of the initial settings of authentication server database 66a is shown in Table XI which contains the relevant information for port $Pa_1$ of access controller 54a.

TABLE XI

Security Database 66a of Authentication Server 38a

Record # 1

| Field 1 | Phone Number (Stores Field 1 of Table IX) | 5625800 |
|---|---|---|
| Field 2 | Identification Number (Stores Field 2 of Table IX) | xy45678 |
| Field 3 | Access Controller's Public Key | Pa1PUB(default) |
| Field 4 | Access Controller's Private Key (Stores Field 3 of Table IX) | Pa2PRV(default) |
| Field 5 | Expiry Period (Stores Field 4 of Table IX) | 5 days |
| Field 6 | Time to remain active after disconnect (Stores Field 5 of Table IX) | 2 hours |
| Field 7 | Power up counter (Stores Field 8 of Table IX) | 001 |
| Field 8 | Authentication Server's Private Key | asPRV |

Table XI shows one record, labelled Record 1, which reflects information corresponding to port $Pa_1$ of access controller 58a. Thus, Fields 1, 2, 4, 5, 6 and 7 of Table XI store the same information as Fields 1, 2, 3, 4, 5 and 8 of Table IX, respectively. Table XI also includes a Field 3, Port $Pa_1$'s Public Key, which corresponds to the factory preset private key in Field 4, and is identified in Table II as "Pa1PUB (default)". Field 8, Authentication Server's Private Key, corresponds to the key in Field 4, and is identified in Table II as "asPRV". It will now be apparent to those skilled in the art that Table XI can also store additional records for any additional access controllers that are included in system 30.

Figure 7:
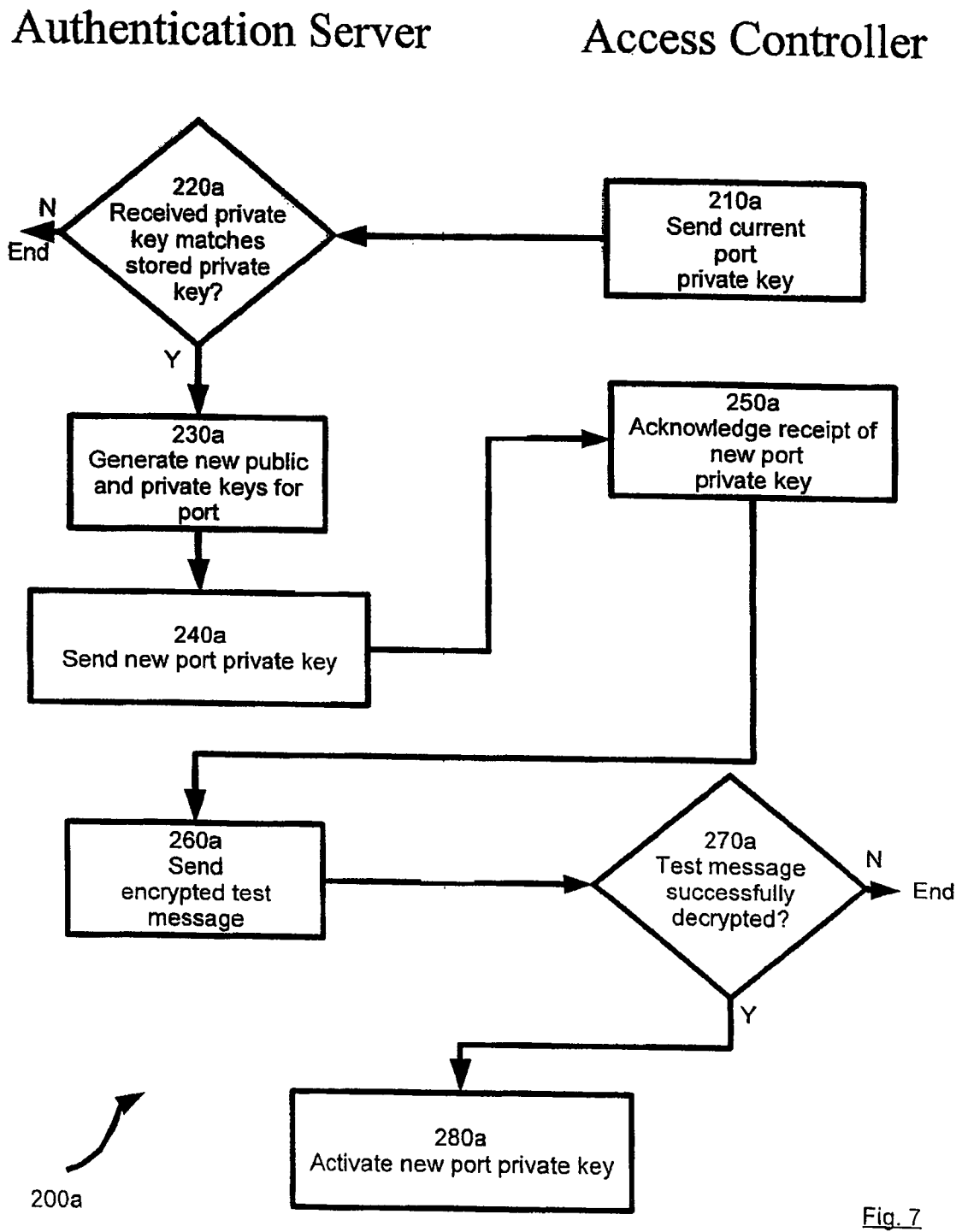
FIG. 7 is a flow chart showing a method of updating encryption keys for the access controller of FIG. 6 in accordance with another embodiment of the invention.

Referring now to FIG. 7, a method for updating a port's encryption keys is indicated generally at 200*a*. In order to assist in the explanation of the method, it will be assumed that method 200*a* is performed using system 30*a*. Furthermore, the following discussion of method 200*a* will lead to further understanding of system 30*a* and its various components. (However, it is to be understood that system 30*a* and/or method 200*a* can be varied, and need not work exactly as discussed herein in conjunction with each other, and that such variations are within the scope of the present invention.)

Operation of system 30*a* using method 200*a* is substantially similar to the operation of system 30 using method 200 except that the encryption keys that are exchanged are the port keys rather than access controller keys. At step 210*a*, the current port private key is sent from the access controller 54*a* to the authentication server 38*a*. The port private key is encrypted at access controller 54*a* using the authentication server's public key asPUB, and decrypted by the authentication server, using the private key asPRV, thus establishing secure communication of the current port private key between access controller 54*a* and authentication server 38*a*. Accordingly, access controller 54*a* retrieves Port $Pa_1$'s Private Key, from its security database 62*a*. Using the data listed in Table IX as an example, the Port $Pa_1$'s Private Key stored in access controller 54*a* is currently set to "$Pa_1$PRV(default)". The retrieved key is sent to authentication server 38*a* via network 46*a*.

At step 220*a*, it is determined whether the received private key matches the stored private key for port $Pa_1$. Thus, authentication server 38*a* upon receipt of the key sent at step 210, will compare the received private key with the private key associated with port $Pa_1$ by examining the contents of security database 66*a*. If a match is found between the received access controller private key (i.e. "$Pa_1$PRV(default)") and the access controller private key stored Field 4 of Table XI (i.e. "$Pa_1$PRV (default)"), then a match is found and method 200*a* will advance to step 230*a*—otherwise method 200*a* ends due to a perceived security breach. Method 200*a* can begin anew in the event that such mismatch was merely a communications error.

At step 230*a*, a new public and private key pair for the port is generated. Thus, authentication server 38*a* will perform a predefined operation to generate a new private key (represented herein as "$Pa_1$FPRV(new)") and a new public key (represented herein as "$Pa_1$PUB(new)") for the port.

At step 240*a*, the new private key generated at step 230*a* is sent to the access controller. The new port private key is encrypted at authentication server 38*a* using the old port public key, and decrypted by access controller 54*a*, using the old port private key, thereby establishing secure communication of the new port private key between authentication server 38*a* and access controller 54*a*. The new port private key, $Pa_1$PRV(new), will thus be sent via network 46 back to access controller 54*a*.

At step 250*a*, receipt of the new private key is acknowledged. Thus, access controller 54*a*, upon receipt of new private key, $Pa_1$PRV(new) sent at step 240*a*, will acknowledge such receipt to authentication server 38*a*.

At step 260*a*, an encrypted test message is sent. Authentication server 38*a* will prepare a known-test message, such as the text string "OK", and encrypt that message using new port $Pa_1$ public key, $Pa_1$PRV(pub), and send that encrypted test message to access controller 54*a*.

At step 270*a*, access controller 54*a* will attempt to decrypt the encrypted test message using new port $Pa_1$ private key, acPRV(new), and if the decryption is unsuccessful, the method will end, and at this point, it can be desired to start method 200*a* anew and re-attempt the update. If, however, the decryption is successful and access controller 54*a* successfully recovers the known-test message (i.e. the text string "OK"), then the method advances to step 280*a*.

At step 280*a*, the new port $Pa_1$ private key is activated. Thusly, access controller 54*a* will update security database 62*a* to store new port private key with $Pa_1$PRV(new). Similarly, authentication server 38*a* will update its security database 66*a* to reflect both the new access controller private key and the new access controller public key. During the performance of this step, access controller 54*a* will also transmit the contents of the Port Identifier and Switch 50*a* Identifier fields of LUT 82*a* to authentication server 38*a*.

Table XII shows the contents of security database 62*a* after the performance of step 280*a*.

TABLE XII

Security Database 62a of Access Controller 54a for Port $Pa_1$

| Record #1 | Field # | Field | Data |
|---|---|---|---|
| | 1 | Phone Number | 5625800 |
| | 2 | Identification Number of Access Controller | xy45678 |
| | 3 | Port $Pa_1$'s Private Key | Pa1PRV(new) |
| | 4 | Inactive Expiry Period | 5 days |
| | 5 | Time to remain active after disconnect | 2 hours |
| | 6 | Date of last change | Feb. 1, 2003 |
| | 7 | Time of last disconnect | 23:59:59 |
| | 8 | Power up counter | 001 |
| | 9 | Authentication Server's Public Key | asPUB |

In particular, note that in Table XII, Field 3, Port $Pa_1$'s Private Key is updated to "$Pa_1$PRV(new)", while date of last change was changed from Jan. 31, 2003, to Feb. 1, 2003, assuming a hypothetical date of the performance of method 200*a* to be on Feb. 1, 2003.

Table XIII shows the contents of security database 66*a* after the performance of step 280*a*.

TABLE XIII

Security Database 66a of Authentication Server 38a

Record # 1

| Field 1 | Phone Number (Stores Field 1 of Table XII) | 5625800 |
|---|---|---|
| Field 2 | Identification Number (Stores Field 2 of Table XII) | xy45678 |
| Field 3 | Access Controller's Public Key | $Pa_1$PUB(new) |
| Field 4 | Access Controller's Private Key (Stores Field 3 of Table XII) | $Pa_2$PRV(new) |
| Field 5 | Expiry Period (Stores Field 4 of Table XII) | 5 days |
| Field 6 | Time to remain active after disconnect (Stores Field 5 of Table XII) | 2 hours |
| Field 7 | Power up counter (Stores Field 8 of Table XII) | 001 |
| Field 8 | Authentication Server's Private Key | asPRV |

In particular; note that in Table XIII, Field 3, Port $Pa_1$'s Public Key is updated to "$Pa_1PUB(new)$", while Field 4, Port $Pa_1$'s Private Key is updated to "$Pa_1PRV(new)$".

Table XIV shows the contents of the record of database 86a stored at authentication server 38a after the performance of step 280a.

TABLE XIV

Record of database 86a of Authentication Server 38a

| Access controller Identification Number | Port Identifier | Switch 50a Identifier |
|---|---|---|
| xy45678 | $Pa_1$ | s12345 |
|  | $Pa_2$ | s12346 |
|  | $Pa_n$ | s12347 |

In particular, note that in Table XIV, fields titled Port Identifier are updated to $Pa_1$, $Pa_2$, $Pa_n$, and fields titled Switch 50a Identifier are updated to s12345, s12346, s12347. Accordingly, Table XIV represents that port Pa is in communication with switch 50a identified as s12345, port $Pa_2$ is in communication with switch 50a identified as s12346, and that port $Pa_n$ is in communication with switch 50a identified as s12347.

At this point, method 200a terminates. Method 200a can be executed from time to time to update the access controller encryption keys and thereby enhance the overall security of system 30a, as well as to inform authentication server 38a of any changes in the association of switches 50a with ports Pa that may have taken place.

Other embodiments of the present invention provide means for making the access controller public key available to client 42a so that secure access between client 42a and switch 50a can be effected. Referring again to FIG. 6, client 42a thus also includes its own security database 70a, which is mirrored by an additional security database 74a stored in authentication server 38a.

When client 42a is originally configured, security database 70a appears in accordance with Table XV.

TABLE XV

Security Database 70a of Client 42a

| Field # | Field | Data |
|---|---|---|
| 1 | Name | Joe Smith |
| 2 | UserID | 1234 |
| 3 | Password | b56789xx |
| 4 | Switch Identifier | s12345 |
| 5 | Port Identifier | <Empty> |
| 6 | Access Controller Identification Number | <Empty> |
| 7 | Port Public Key | <Empty> |
| 8 | Remote Office Phone Number | <Empty> |

Describing Table XV in greater detail, Field 1, Name, is the name of the particular user that owns or is in possession of client 42a and in this particular example is "Joe Smith". It is thus assumed that Joe Smith is an individual or employee who is intended to have access to switch 50a. Generally, Field 1 remains fixed. Field 2, UserID, is a unique identifier assigned to Joe Smith, in this example, "1234". Similarly, Field 3, Password, is a second unique identifier assigned to Joe Smith, in this example, "b56789xx". UserID and Password are assigned to Joe Smith in any known manner as may be desired, and are typically provided to Joe Smith, in person, so that as the user of client 42a Joe Smith can populate Fields 2 and 3 of security database 70a through a user interface on client 42a. Field 4 contains the identifier for the destination switch 50a.

Continuing with describing Table XIV, Field 5, Port Identifier, Field 6, Access Controller Identification Number, Field 7, Port Public Key, Field 8, Remote Office Phone Number are initially blank, and client 42a is operable to communicate with authentication server 38 in order to populate those fields, as will be explained in greater detail below.

By the same token, security database 74a appears in authentication server 38a accordance with Table XVI.

TABLE XVI

Security Database 74a of Authentication Server 38a

| Record # | Field 1 Name (Field 1 of Table V) | Field 2 User ID (Field 2 of Table V) | Field 3 Password (Field 3 of Table V) |
|---|---|---|---|
| 1 | Joe Smith | 1234 | b56789xx |

Table XVI shows one record, labelled Record 1, which reflects information corresponding to the user of client 42a. Thus, Fields 1, 2, and 3 of Table XVI store the same information as Fields 1, 2, and 3, of Table XV, respectively. It should now be apparent to those skilled in the art that Table XVI can also store additional records for any additional clients 42a that are included in system 30a.

The performance of method 300 using system 30a, is substantially similar to the performance of method 300 using system 30. A variation in the performance of the method occurs only during the performance of two steps. Referring to FIG. 3, the performance of step 340 using system 30a (in contrast to system 30) involves the addition of the switch 50a identifier (in this case s12345) to the encrypted data transmitted from client 42a to authentication server 38a. Similarly, the performance of step 355 using system 30a (in contrast to system 30) includes the addition of a port identifier associated with switch 50a (in this case $Pa_1$) to the encrypted data transmitted from authentication server 38a to client 42a. Thus, once method 300 is performed using system 30a, security database 70a appears in accordance with Table XVII.

TABLE XVII

Security Database 70a of Client 42a

| Field # | Field | Data |
|---|---|---|
| 1 | Name | Joe Smith |
| 2 | UserID | 1234 |
| 3 | Password | b56789xx |
| 4 | Switch Identifier | s12345 |
| 5 | Port Identifier | $Pa_1$ |
| 6 | Access Controller Identification Number | xy45678 |
| 7 | Port Public Key | Pa1PUB(new) |
| 8 | Remote Office Phone Number | 5625800 |

Having so populated security database 70a using method 300, client 42a is now operable to securely access switch 50a in central office 34a through the performance of method 400. The performance of method 400 using system 30a is substantially similar to the performance of method 400 using system 30. A variation of note is the transmission of a port identifier from client 42 to access controller 54a. Referring to FIG. 4, as part of the performance of step 425 using system 30a, a port identifier Pa (in this case $Pa_1$) is transmitted from client 42a to access controller 54a. This port identifier $Pa_1$ is then used, at step 445, by access controller 58a, to determine the IP address respective to the destination switch 50a using LUT 82a. The communications are routed to switch 50a accordingly. This is in contrast to the performance of step 445 using system 30 where access controller 54 does not have to perform any routing function since access controller 54 is connected to only one switch 50.

Figure 8:
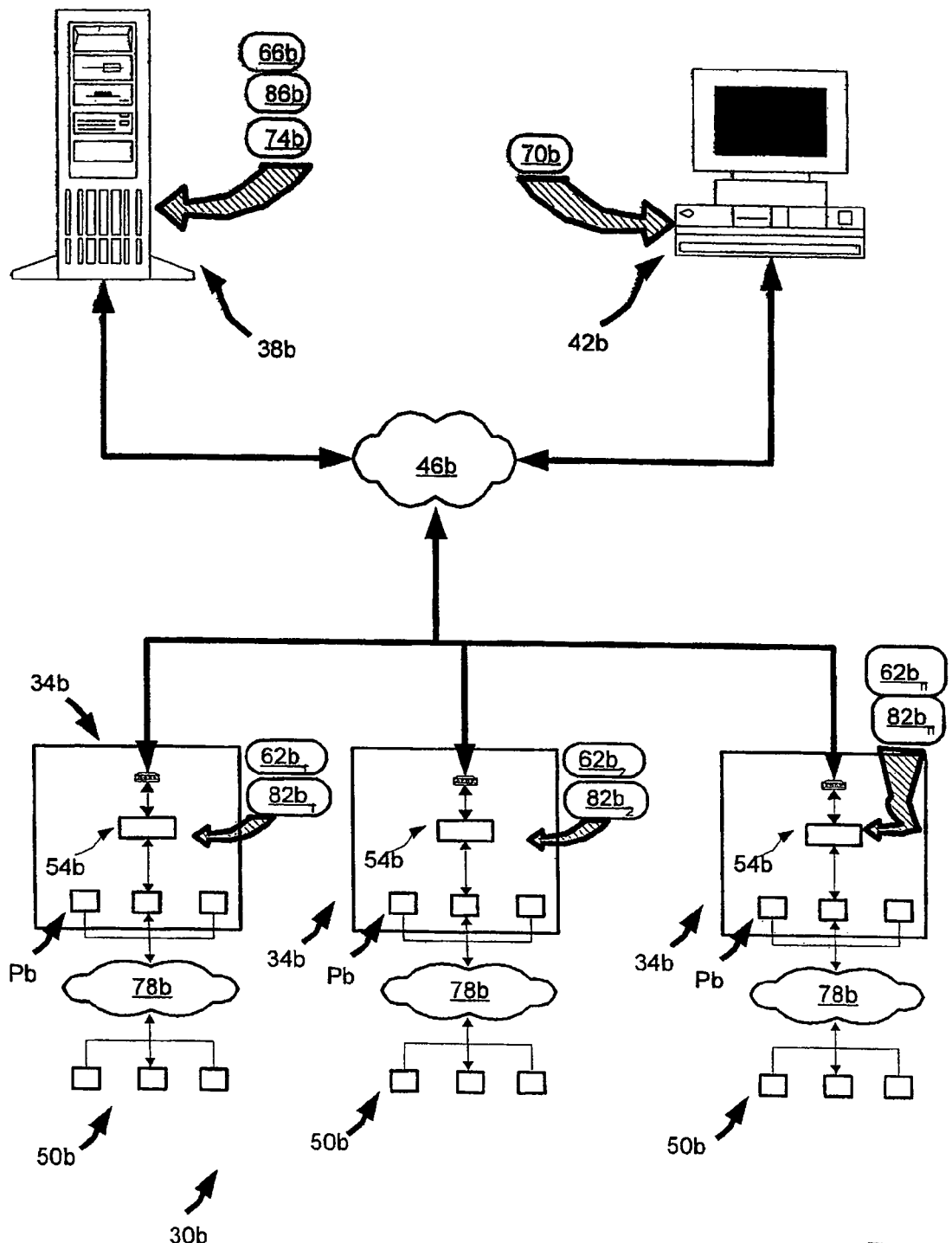
FIG. 8 is a block diagram of a system for secure access in accordance with another embodiment of the invention.

Referring now to FIG. 8, a system for secure access in accordance with another embodiment of the invention is indicated generally at 30b. System 30b is substantially the same as system 30a, and like elements in system 30b bear the same reference as like elements in system 30a, except followed by the suffix "b" instead of suffix "a". In FIG. 8 certain reference characters are omitted in order to simplify presentation. System 30b differs from system 30a in that system 30b comprises a plurality access controllers 54b. Moreover, each access controller 54b maintains a separate copy of its own copy of security database 62b, and LUT 82b.

The operation of system 30b for securely communicating with a destination switch 50b is substantially the same as system 30a The contents of databases associated with authentication server 38b and access controllers 54b are populated through the performance of method 200a in substantially the same manner as the performance of method 200a using system 30a. Method 200a is performed once for each access controller 54b to secure communications with all switches 50b in system 30b.

After performing method 200a to update the port encryption keys, security database 70b of client 42b can now be updated through the performance of method 300. Client 42b's security database 72b is updated in substantially the same manner as the security database 72a in system 30a using method 300. In particular, client 42b receives the phone number of office 34b and the identification number of access controller 54b enabling it to connect to access controller 54b.

Client 42b can then securely communicate with the destination switch 54b through the performance of method 400 in substantially the same manner as client 42a during the operation of system 30a using method 400.

Figure 9:
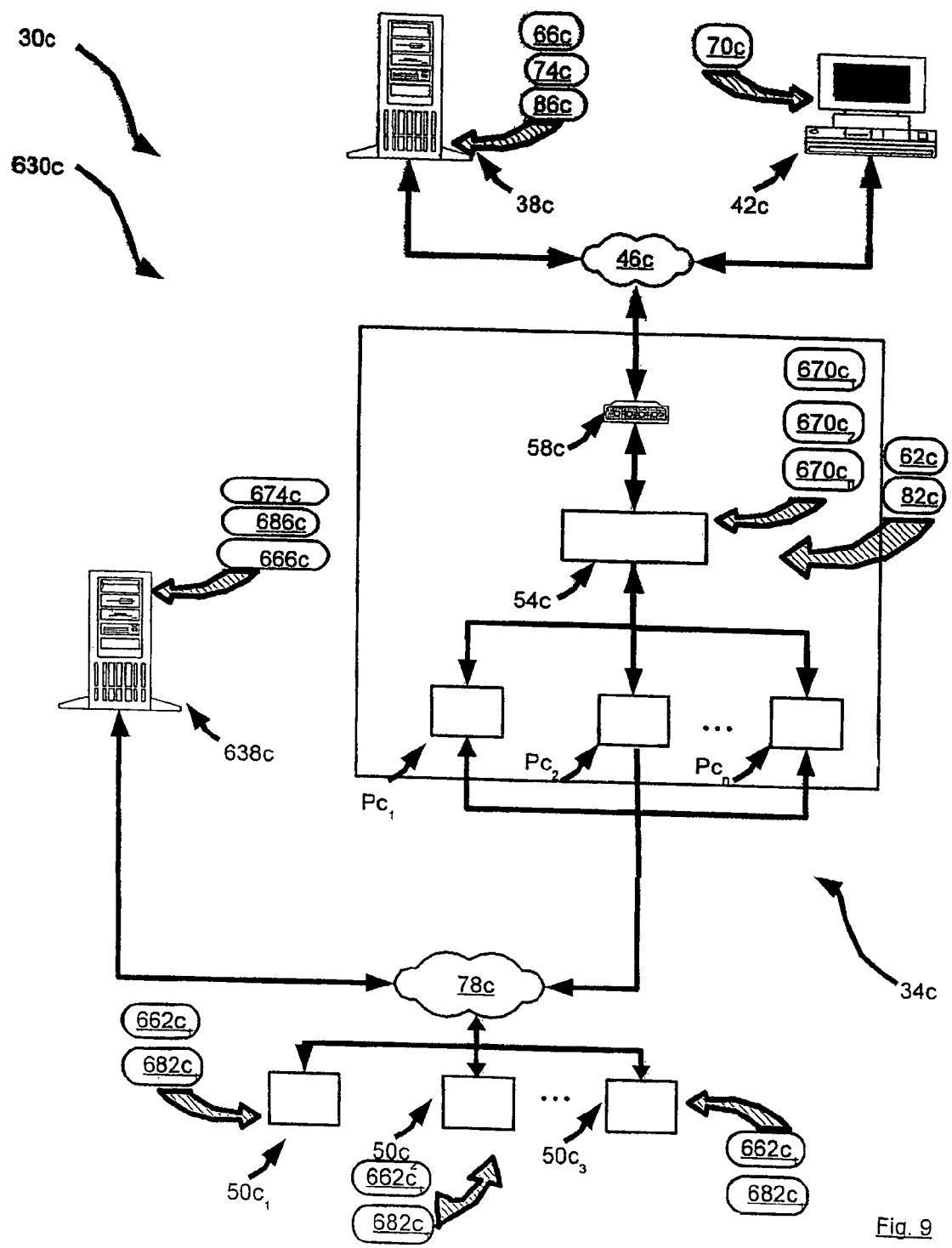
FIG. 9 is a block diagram of a system for secure access in accordance with another embodiment of the invention; and, FIG. 10 is a block diagram of a system for secure access in accordance with another embodiment of the invention.

Referring now to FIG. 9, a system for secure access in accordance with another embodiment of the invention is indicated generally at 30c. System 30c is includes many of the same elements as system 30b, and like elements in system 30c bear the same reference as like elements in system 30b, except followed by the suffix "c" instead of suffix "b". Moreover, certain elements found in system 30c but not in system 30b are functionally and structurally similar to certain existing elements of 30b. References of such elements in system 30c are further preceded by a prefix "6".

System 30c differs from system 30b in that system 30c comprises a subsystem 630c. Subsystem 630c includes an additional authentication server 639c. Authentication server 638c is substantially similar to authentication server 38b and like authentications server 38b contains an LUT database 686c, a security database 666c and a security database 674c. Moreover, authentication server 638c is connected to network 78c rather than network 46c.

Secure communications in subsystem 630c is carried out in an analogous manner to system 30b. Authentication server 638c, similar to authentication server 38b acts as a trusted third party to assist in security in communications between two other computing devices located remotely from each other. However, whereas authentication server 38b assists communications between client 42b and remote office 34b, authentication server 638c assists communications between ports Pc (and therefore access controller 54c) and switches 50c. As mentioned previously, the term "client" encompasses a wide range of computing devices and hence ports Pc (and therefore access controller 54c) is analogous to client 42b as far as secure communications are concerned, utilizing keys generated by authentication server 638c when conducting its communications with switch 50c. Similarly, network 78c is analogous to network 46a since secure communications can be carried over a variety of networks including an intranet. Moreover, switches 50c are analogous to the role of remote office 34b in system 30b, operable to make use of unique keys generated by authentication server 638c in order to authenticate whether communications with ports Pc are authorized (i.e. as an access controller). Of note is that in subsystem 630c switches 50c are the final destination for communications, whereas, in system 30b, access controller 54b routes the communications to switch 50b. Also of note between subsystem 630c and system 30b is that unlike client 42b which has one security database 70b, access controller 54c (which is system 630c's analogue to client 42b), maintains multiple security databases 62c, one for each port Pc.

One result of incorporating subsystem 630c into system 30c is that through the performance of methods 200a through 400 by subsystem 630c, communications between each port Pc and switch 50c are secure. This is in contrast to system 30b where communications between each port Pb and switch 50b are not secure. In summary, communications between client 42c and any one of ports Pc is the same as the communication between client 42b and any one of ports Pb in system 30b. However, communications between ports Pc and switches 50c are now also encrypted, using the same technique employed in system 30b. It should now be apparent, however, that other techniques can be employed to encrypt communications between ports Pc and switches 50c.

It should now also be apparent that, system 30b can be modified so that encryptions between client 42b and switches 50b are effected by having authentication server 38b arrange for appropriate keys from the key pairs to be located at those switches 50b, rather than in access controller 54b.

Figure 10:
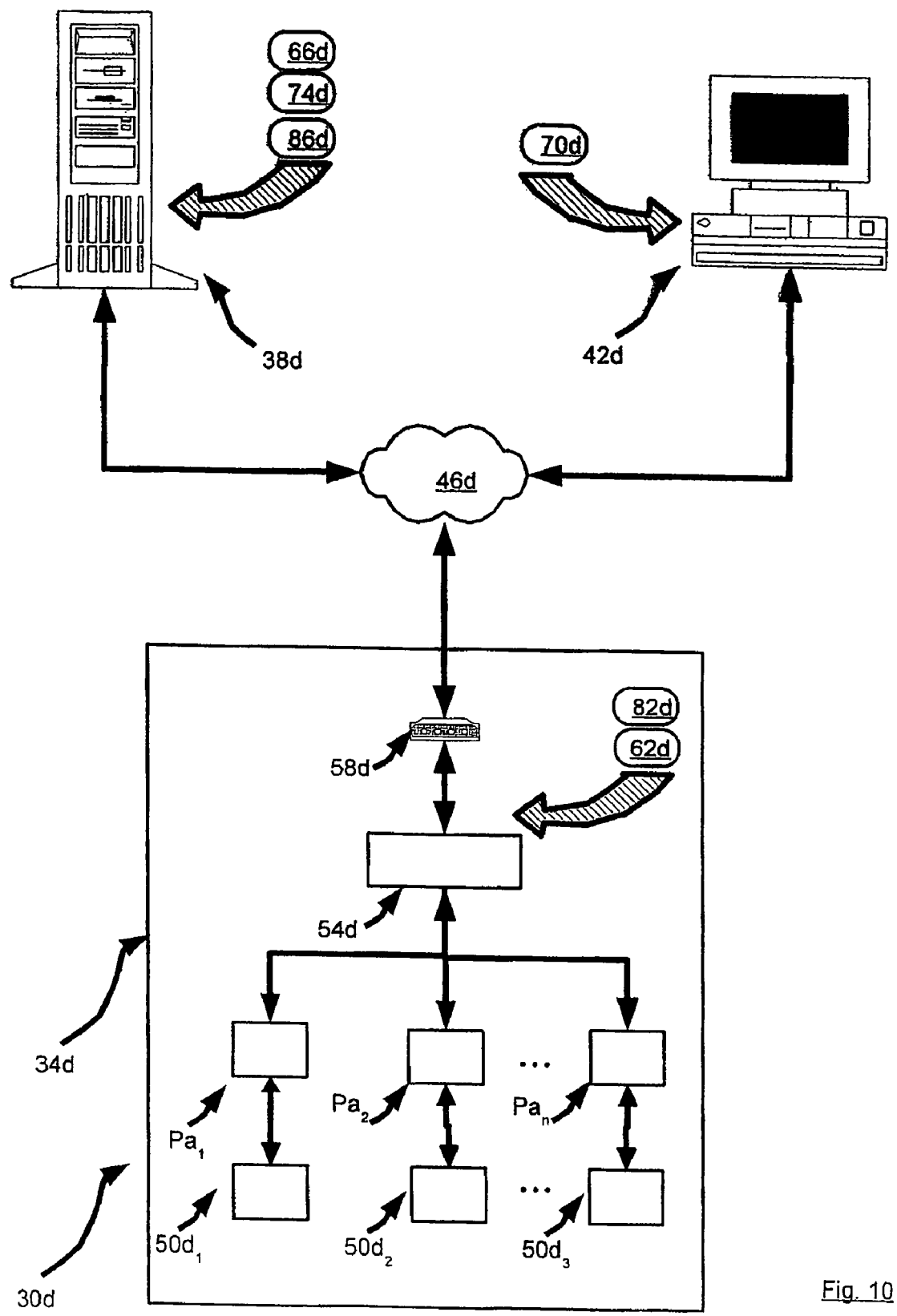

Combinations of the features and components of systems 30, 30a, 30b, and 30c can also be effected. Referring now to FIG. 10, a system for secure access in accordance with another embodiment of the invention is indicated generally at 30d. System 30d represents one such possible combination, including features from system 30 and system 30a. Like elements in system 30d bear the same reference as like elements in system 30 and system 30a, except followed by the suffix "d".

System 30d, similar to system 30a, comprises a plurality of switches 50d in contrast to system 30's single switch. Moreover, again in similarity to system 30a, plurality of switches 50d are connected to a single access controller 54d through ports 1b. However, in system 30d, unlike system 30a, and similar to system 30 each port Pd is connected to a switch 50d directly, without the intervening network 78a in system 30a. In a present embodiment each port Pd communicates with a respective switch 50d using an asynchronous serial communication protocol as defined in the RS-232 specification, initially published by Electronic Industries Association in 1969, or the infrastructure used to employ Teletypewriter ("TTY"), although other protocols and/or infrastructures can be employed.

The operation of system 30d is substantially similar to system 30a. The contents of databases associated with authentication server 38d and access controllers 54d are populated through the performance of method 200a in substantially the same manner as the performance of method 200a using system 30a.

After performing method 200a to update the port encryption keys, security database 70d of client 42d can now be updated through the performance of method 300. Client 42d's security database 72d is updated in substantially the same manner as the security database 72a in system 30a using method 300. In particular, client 42a receives the phone number of office 34a and the identification number of access controller 54a enabling it to connect to access controller 54a.

Client 42d can then securely communicate with the destination switch 54d through the performance of method 400 in substantially the same manner as client 42a during the operation of system 30a using method 400. A difference of note is that at step 445 access controller 54d can forward communications directly to switch 50d without having to determine the address of switch 50d. This is in contrast to system 30a where access controller has to know the IP address respective of each switch 50a in order to route the communications to each switch 50a. In such a direct connection access controller 54d need not have any addressing functionality to route traffic to each switch 50d, as the physical connection between the port Pd and the switch 50d effectively handles traffic routing and obviates the need for LUT 82a.

While only specific combinations of the various features and components of the present invention have been discussed herein, it will be apparent to those of skill in the art that subsets of the disclosed features and components and/or alternative combinations of these features and components can be utilized, as desired. For example, method 400 describes one particular way of utilizing the public key acPUB and private key acPRV to provide secure access to switch 50 from client 42, however, other utilizations of these keys can be effected to provide other means of providing secure communications between client 42 and switch 50. For example, it is contemplated that the actual instruction received at step 410 could simply be encrypted using public key acPUB, and decrypted by access controller 54 using private key acPRV before passing the same to switch 50.

Furthermore, it is also contemplated that access controller 54 can be incorporated directly into switch 50 (or such other computer equipment to embodiments of the present invention may be applied).

Furthermore, it should be understood that further encryption protocols can be employed. For example, method 300 can be modified so that the initial sending of the UserID of client 42 is delivered to authentication server 38 in an encrypted format. Such encryption can be performed using a variety of techniques, such as utilizing another set of private and public keys that are generated and updated from time-to-time by authentication server 38 and, such updates being provided to client 42 at the same time.

Furthermore, while system 30 was described in particular detail in relation to remote access of a central office telecommunication switch, it is to be reiterated that system 30 can be modified and applied to a very broad variety of applications where access to computer equipment is to be effected. For example, while system 30 included references to a network 46 that was described in relation to the PSTN, it is to be understood that network 46 can be any type of network that can carry communications between a client, such as client 42, and computer equipment, such as switch 50. Other types of networks can include local area networks, wide area networks, the internet, intranets, 802.11b (and its variants) wireless networks, Bluetooth wireless networks, GSM/GPRS wireless networks and the like—and in such variations of network 46, it will now be apparent that the corresponding interfaces respective to the client and the remote computer equipment being accessed by the client will thus correspond to the particular type of network.

In still further variations of system 30, it should be understood that network 46 can be eliminated (or at least simplified) and replaced With a simple RS-232, USB, infra-red or other type of direct connection between the client and the access controller that polices access to the computer equipment that the client is attempting to access. Thus, the execution of method 400 can be carried out by physically connecting client 42 to access controller 54 through an RS-232 or USB cable. By the same token, authentication server 38 can be physically located within central office 34 and thereby facilitate a direct connection between authentication server 38 and access controller 54. Other configurations of the components in system 30, and network configurations thereof, will now occur to those of skill in the art.

In still another variation of system 30a, access controller 54a can employ additional security measures to secure access between client 42a and switch 50a. For example, in system 30a, client 42a can supply access controller 54a with both the switch identifier and port identifier with which switch 50a is supposed to be associate Access controller 54a can then compare the port identifier Pa and switch identifier supplied by client 42a, to verify that the port identifier Pa and switch identifier are correctly associated in LUT 82a. If not, the instruction can be discarded due to a perceived breach in security, or client 42a can be redirected to authentication server 38a for reauthorization.

In yet another variation, where access controller 54a is operable alter the contents of LUT 82a, then dynamic reassignment of switches 50a to different ports Pa can be used in response to a variety of situations, such as a failure of a port Pa. In such cases access controller 54a would employ various methods for informing both client 42a and access server 38a of the change. For example, after a port change access controller could re-perform method 200a to update access server 38a, and force client 42a to re-perform method 300 before continuing communication with switch 50a. Alternatively, access controller 54a can be prevented from reassigning ports while it is engaged with a client 42a.

In another variation, system 30a a could use dynamic IP addresses for switches 50a, via the Dynamic Host Configuration Protocol ("DHCP") or the like. In this case, LUT 82a can be populated and updated by each switch 50a sending a periodic message to access controller 54a that contains its IP address and identifier.

Regardless of the way by which client 42 is connected to switch 50 (or other type of computer equipment), it is to be understood that the way by which client 42 initiates communication with access controller 54 will be consistent with that type of connection or network interface. For example, where network 46 is the Internet, and interface 58 is a router having its own IP address, then client 42 will connect to access controller 54 using the IP address of that router, at which point method 400 can otherwise execute as described above. As a different example, during method 400 it can be desired to have server 38 carry communications between client 42 and access controller 54, acting as a proxy therebetween, and thereby obviate the need for client 42 to actually be aware of the telephone number of interface 58 (or IP address, depending on how interface 58 connected to server 38), and thereby providing additional security over the access to switch 50. It should be understood that while the foregoing makes reference to elements in system 30, such variants are also applicable to system 30a, 30b, 30c, 30d and/or combinations thereof.

Also, it should now be apparent to those of skill in the art that other types of computer equipment (i.e. equipment other than telecommunications switch 50 or 50a) that are to be securely accessed by a client include mainframes, routers, bridges, hosts, file servers, print servers, mail servers, web servers, firewalls, and the like and that system 30 and 30*a* and the embodiments herein can be modified to provide secure access to those other types of computing equipment, and that such modifications are within the scope of the invention. By the same token, such computing equipment can, in and of itself, have its own authentication or security methods, such that a user at client 42 (or its variants) will have to additionally authenticate with that computing equipment in addition to the authentication already being performed with access controller 54 (or its variants). Such additional authentication will thus introduce another layer of security running above the systems and methods for secure access described herein. Techniques for such additional authentication will readily occur to those of skill in the art, and include, a user-name and password; Internet Protocol Security ("IPSec"); Virtual Private Network ("VPN"); Protected Extensible Authentication Protocol ("PEAP"); Transport Layer Security ("TLS") and the like, or combinations thereof.

In another variant on the embodiments discussed in relation to system 30, it is to be understood that a variety of means can be used to create and maintain the various security databases of system 30. For example, system 30 can also include a Lightweight Directory Access Protocol ("LDAP") server (not shown in FIG. 1) that is accessible by server 38, client 42 and access controller 54. The LDAP server can be used to maintain and update a central repository of permissions for various users of client 42 (or additional clients added to system 30) who wish to access system 30. Thus, various portions of databases 62, 66, 70 and 74 relating to a particular user of client 42 can be built, and maintained from time to time, by accessing the LDAP server. Various security features can be built into the LDAP server, such as using digital certificates belonging to a particular user, can be utilized to enhance the security with which databases 62, 66, 70 and 74 are built and maintained. The LDAP server can also be made web-accessible, over a secure sockets layer (SSL) to a user of client 42, as a way of relaying and updating UserID and password data respective to that user. In this configuration, the LDAP server, and the access thereof by server 38, client 42, and access controller 54 would be effected on a regular basis to verify access of system 30. By the same token, the LDAP server itself would typically be subject to verification on a regular basis by another high authority.

While portions of the foregoing description may individually reference systems 30, 30*a*, 30*b* and 30*c*, it should now be apparent that all or parts of each of these systems can be combined as appropriate or otherwise desired. Accordingly, those of skill in the art will recognize that when certain references are made to one of these systems, and/or its components, such teachings can also be applicable to other ones of those systems.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A system comprising: an authentication server, a client and an access controller interconnectable for communications therebetween; said access controller including a plurality of ports each connectable to a respective one of a plurality of computers; said authentication server operable to deliver a given first key from among a plurality of first keys to said client; said access controller operable to store a plurality of second keys each of which is complementary to a respective one of said first keys for encrypting at least a portion of communications between said client and said controller; said access controller operable to associate each of said second keys with a respective one of said ports; said access controller further operable to receive, from said client, instructions and an indication of a specified one of the ports and to pass said instructions to the computer connected to the specified one of the ports according to a verification protocol utilizing the second key associated with the specified one of the ports and the given first key, wherein said verification protocol includes a generation of a random number by said client, an encryption of said random number by said client using said given first key, a delivery of said random number and said encrypted random number from said client to said access controller, a decryption of said encrypted number by said access controller using the second key associated with specified one of the ports, a comparison of said random number and said decrypted number, and a decision to pass at least a portion of said instructions to the computer connected to the specified one of the ports via the specified one of the ports when said comparison finds a match of said random number with said decrypted number.

2. The system according to claim 1 wherein said authentication server is operable to generate said plurality of first keys and said plurality of second keys and to deliver said plurality of second keys to said access controller.

3. The system according to claim 1 wherein communications between said client and said access controller are carried via said authentication server.

4. The authentication system according to claim 1 wherein each of said first keys is a public encryption key and each of said second keys is a complementary private encryption key.

5. The authentication system according to claim 1 wherein said authentication server and said client are interconnectable by a first communication medium and said access controller and said client are interconnectable by a second communication medium; said mediums selected from the group of networks consisting of an Intranet, the Internet, the Public Switched Telephone Network (PSTN), a local area network, and a wireless network.

6. The authentication system according to claim 1 wherein the computer connected to the specified one of the ports is a telecommunications switch.

7. The authentication system according to claim 1 wherein said instruction is encrypted by said client using said given first key and said verification protocol is based on a successful decryption of said instruction by said access controller using the second key associated with the specified one of the ports.

8. The authentication system according to claim 2 wherein said given first key is only delivered to said client after the second key associated with the specified one of the ports has been successfully delivered to said access controller.

9. The authentication system according to claim 1 wherein said given first key is only delivered to said client if a user operating said client authenticates said user's identity with said server.

10. The authentication system according to claim 2 wherein said access controller contains a preset key and said server maintains a record of said preset key; said server operable to only generate said given first key and the second key complementary to the given first key if said access controller successfully transmits said preset key to said server and said transmitted preset key matches said server's record thereof.

11. An access controller for intermediating communications between an interface and a plurality of ports; said access controller operable to store a plurality of second keys each of which is complementary to a respective one of a plurality of first keys; said access controller operable to associate each of said second keys with a respective one of said ports; said access controller operable to communicate with a client via said interface and with a plurality of computers via respective ones of said ports; said client operable to store a given one of said first keys and to receive instructions from a user; said access controller operable to receive, from said client, said instructions and an indication of a specified one of the ports and to selectively pass said instructions to the computer connected to the specified one of the ports when a verification protocol utilizing the second key associated with the specified one of the ports and the given one of the first keys is met, wherein said verification protocol includes a generation of a random number by said client, an encryption of said random number by said client using said given one of the first keys, a delivery of said random number and said encrypted random number from said client to said access controller, a decryption of said encrypted number by said access controller using the second key associated with the specified one of the ports, a comparison of said random number and said decrypted number, and a decision to pass at least a portion of said instructions to the computer connected to the specified one of the ports via the specified one of the ports when said comparison finds a match of said random number with said decrypted number.

12. The access controller of claim 11 wherein said access controller is operable to obtain said plurality of second keys from an authentication server and said client is operable to obtain said given one of said first keys from said authentication server, said authentication server operable to generate said plurality of first keys and said plurality of second keys.

13. The access controller of claim 11 wherein each of said first keys is a public encryption key and each of said second keys is a complementary private encryption key.

14. The access controller of claim 11 wherein a medium for connecting said interface and said client is at least one of an RS-232 link, a Teletypewriter (TTY) link, a Universal Serial Bus (USB) cable, the Internet, an Intranet, a Virtual Private Network (VPN), the Public Switched Telephone Network (PSTN), a local area network a wireless network, Internet Protocol Security (IPSec), Protected Extensible Authentication Protocol (PEAP), and Transport Layer Security (TLS).

15. The access controller of claim 11 wherein a medium for connecting each of said ports and the plurality of computers is at least one of an RS-232 link, a Teletypewriter (TTY) link, a Universal Serial Bus (USB) cable, the Internet, an Intranet, a Virtual Private Network (VPN), the Public Switched Telephone Network (PSTN), a local area network, a wireless network, Internet Protocol Security (IPSec), Protected Extensible Authentication Protocol (PERP), and Transport Layer Security (TLS).

16. The access controller of claim 11 wherein the computer connected to the specified one of the ports is a telecommunications switch.

17. The access controller of claim 11 said instruction is encrypted by said client using said given one of the first keys and said verification protocol is based on a successful decryption of said instruction by said access controller using the second key associated with the specified one of the ports.

18. The access controller of claim 12 wherein said given one of the first keys is only passed to said client after the second key associated with the specified one of the ports has been successfully passed to said access controller.

19. The access controller of claim 12 wherein said given one of the first keys is only passed to said client if a user operating said client authenticates said user's identity with said server.

20. The access controller of claim 12 wherein said access controller contains a preset key and said server maintains a record of said preset key; said server operable to only generate said given one of the first keys and the second key complementary to the first key if said access controller successfully transmits said preset key to said server and said transmitted preset key matches said server's record thereof.

21. In an authentication server, a method of delivering a given first key from among a plurality of first keys for securing access between a client and a computer from among a plurality of computers via an access controller having a plurality of ports; said access controller connected to said computers via respective ones of said ports; said access controller having a plurality of second keys each of which is complementary to a respective one of said first keys; said access controller for receiving, from said client, instructions and an indication of a specified one of the ports and for selectively passing said instructions to the computer connected to the specified one of the ports when a verification protocol utilizing the second key associated with the specified one of the ports and the given first key is met, wherein said verification protocol includes a generation of a random number by said client, an encryption of said random number by said client using the given first key, a delivery of said random number and said encrypted random number from said client to said access controller, a decryption of said encrypted number by said access controller using the second key associated with the specified one of the ports, a comparison of said random number and said decrypted number, and a decision to pass at least a portion of said instructions to the computer connected to the specified one of the ports via the specified one of the ports when said comparison finds a match of said random number with said decrypted number; said method comprising: receiving a request for a key from said client; authenticating said request; and sending the given first key to said client when said request is authenticated.

22. The method of claim 21 comprising the additional steps of: receiving a request for a key from said access controller; authenticating said access controller request; generating an updated second key associated with the specified one of the ports and an updated first key corresponding to said updated second key if said access controller request is authenticated; delivering said updated second key to said access controller; receiving a request for a key from said client; authenticating said client request; and sending said updated first key to said client if said client request is authenticated.

23. A method of securing access between a client and a computer from among a plurality of computers via an access controller having a plurality of ports; said access controller connected to said plurality of computers via respective ones of said ports; said method comprising: receiving an instruction at said client destined for said computer; receiving an indication of a specified one of the ports; generating a random number by said client; encrypting said random number by said client using a first key; delivering said random number, said encrypted random number, said indication of the specified one of the ports and said instruction to said access controller; obtaining a second key based on the indication of the specified one of the ports; decrypting said encrypted number using the second key by said access controller; comparing said random number and said decrypted number; and passing at least a portion of said instruction to the computer connected via the specified one of the ports when said comparison finds a match of said random number with said decrypted number.

24. The authentication system defined in claim 1, wherein said verification protocol further includes a decision not to pass said at least a portion of said instruction if no match is found.

25. The access control defined in claim 11, wherein said verification protocol further includes a decision not to pass said at least a portion of said instruction if no match is found.

26. The method defined in claim 23, further comprising discarding said at least a portion of said instruction if no match is found.

27. A method for securing access between a client and a computer from among a plurality of computers via an access controller having a plurality of ports, the access controller connected to the computers via respective ones of the ports, the access controller operable to associate each of the ports with a respective one of a plurality of keys, the method comprising: (a) receiving, from the client, instructions and an indication of a specified one of the ports; (b) obtaining the key that is associated with the specified one of the ports; and (c) passing the instructions to the computer connected to the specified one of the ports when a verification protocol utilizing at least the key is met, wherein said verification protocol includes a generation of a random number by said client, an encryption of said random number by said client using another key that is complementary to the key, a delivery of said random number and said encrypted random number from said client to said access controller, a decryption of said encrypted number by said access controller using the key, a comparison of said random number and said decrypted number, and a decision to pass at least a portion of said instructions to the computer connected to the specified one of the ports via the specified one of the ports when said comparison finds a match of said random number with said decrypted number.

* * * * *